(12) United States Patent
Cregg et al.

(10) Patent No.: US 7,345,998 B2
(45) Date of Patent: Mar. 18, 2008

(54) MESH NETWORK OF INTELLIGENT DEVICES COMMUNICATING VIA POWERLINE AND RADIO FREQUENCY

(75) Inventors: Daniel Cregg, Orange, CA (US); Marcus Escobosa, Lake Forest, CA (US); Ronald Walter, Anaheim, CA (US); Donald Bartley, Lake Forest, CA (US)

(73) Assignee: Smart Labs, Inc., Irvine, CA (US)

( * ) Notice: Subject to any disclaimer, the term of this patent is extended or adjusted under 35 U.S.C. 154(b) by 638 days.

(21) Appl. No.: 11/012,616

(22) Filed: Dec. 15, 2004

(65) Prior Publication Data

US 2006/0126617 A1    Jun. 15, 2006

(51) Int. Cl.
  H04J 1/16    (2006.01)
  H04J 3/24    (2006.01)
  H04L 12/66   (2006.01)
  H04L 12/28   (2006.01)

(52) U.S. Cl. ............ 370/230; 370/235; 370/356; 370/389; 370/390; 370/392; 370/473; 370/474

(58) Field of Classification Search .......... None
    See application file for complete search history.

(56) References Cited

U.S. PATENT DOCUMENTS

| | | | |
|---|---|---|---|
| 4,918,690 A | 4/1990 | Markkula, Jr. et al. ....... 370/94 |
| 4,955,018 A | 9/1990 | Twitty et al. ................. 370/8.5 |
| 4,969,147 A | 11/1990 | Markkula, Jr. et al. .... 370/90.4 |
| 5,090,024 A | 2/1992 | Vander Mey et al. .......... 375/1 |
| 5,192,231 A | 3/1993 | Dolin, Jr. .................... 439/620 |
| 5,420,572 A | 5/1995 | Dolin, Jr. et al. ....... 340/825.22 |
| 5,754,754 A * | 5/1998 | Dudley et al. ................ 714/18 |
| 6,031,818 A * | 2/2000 | Lo et al. ..................... 370/216 |
| 6,636,488 B1 * | 10/2003 | Varma ........................ 370/278 |
| 6,693,907 B1 * | 2/2004 | Wesley et al. .............. 370/390 |
| 6,896,551 B2 | 5/2005 | Hauck et al. ............... 439/620 |
| 6,918,077 B2 * | 7/2005 | Fukushima et al. ......... 714/748 |
| 7,046,642 B1 * | 5/2006 | Cheng et al. ............... 370/320 |
| 7,069,490 B2 * | 6/2006 | Niu et al. ................... 714/748 |
| 7,233,573 B2 * | 6/2007 | Walls et al. ................ 370/236 |
| 7,286,511 B2 * | 10/2007 | Zhong et al. ............... 370/338 |
| 2004/0131125 A1 | 7/2004 | Sanderford Jr. et al. .... 375/261 |

* cited by examiner

Primary Examiner—Melanie Jagannathan
(74) Attorney, Agent, or Firm—Thomas R. Vigil

(57) ABSTRACT

Low-cost intelligent control and communication devices are arranged to communicate with one another over one or more shared physical media, such as a powerline or a radio frequency band. No network controller is needed, because any device can act as a master, slave, or repeater. Adding more devices makes the system more robust, by virtue of a simple protocol for communication retransmissions and retries.

63 Claims, 27 Drawing Sheets

FIG. 2
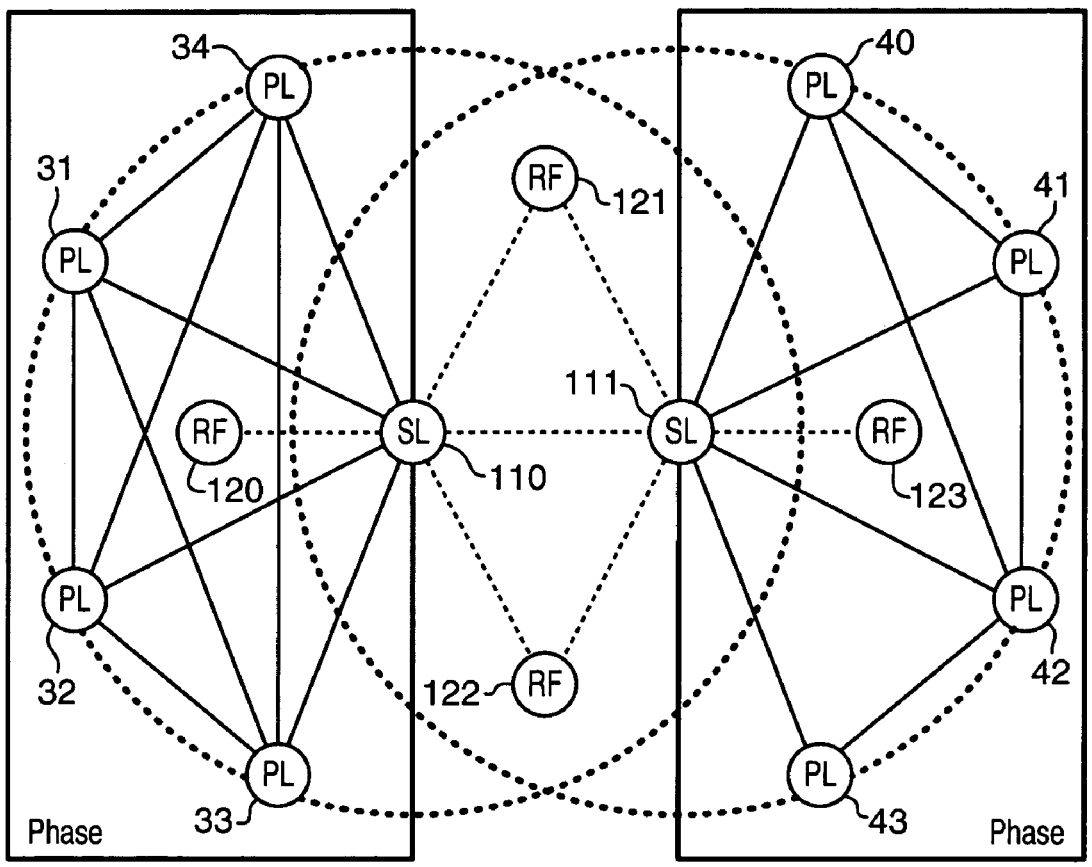
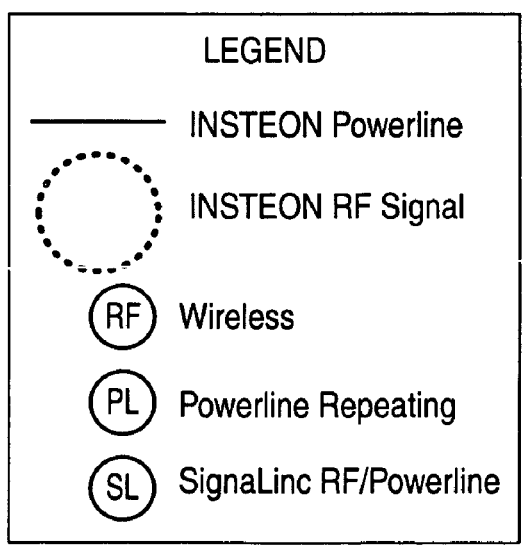

FIG. 3
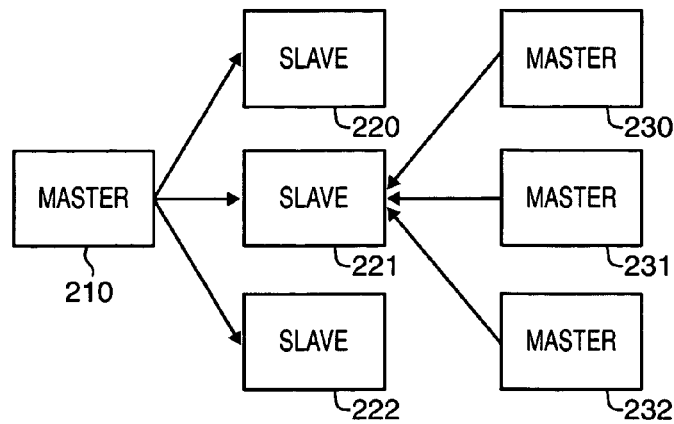
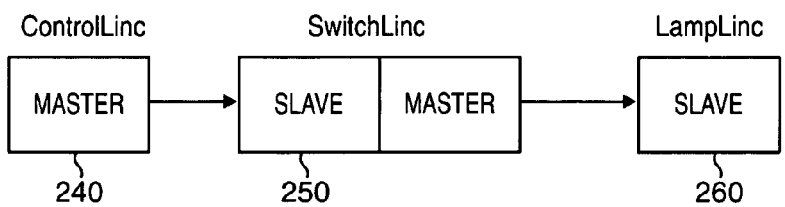
FIG. 4
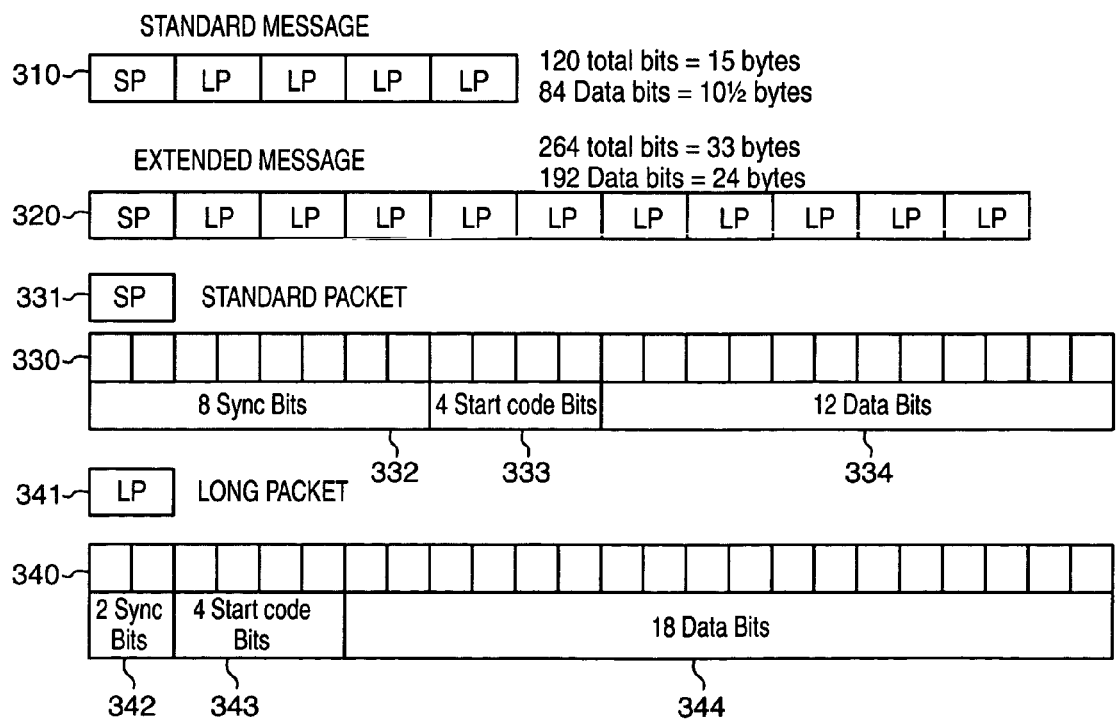

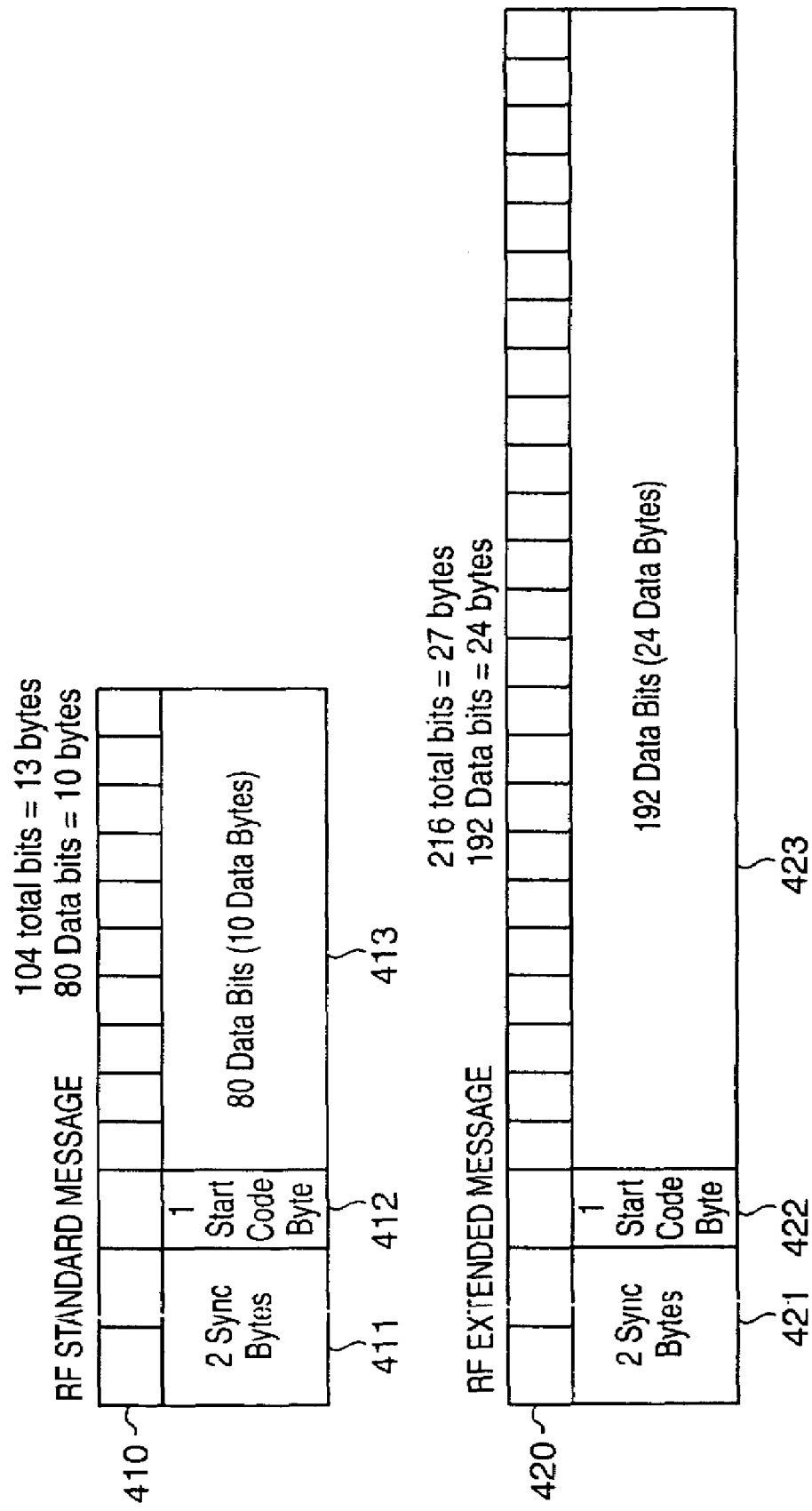

FIG. 6

| | DATA | BITS | CONTENTS |
|---|---|---|---|
| 510 | From Address | 24 | Transmitter unit address |
| 520 | To Address | 24 | For Direct messages:<br>Destination unit address<br>For Broadcast messages:<br>Device Type, Subtype, Firmware Version<br>For Group Broadcast messages:<br>Group Number [0=>255] |
| 530 | Message Flags — 531 Message Type | 1 | Broadcast / NAK: — 532 |
| | 535 Extended Flag | 1 | Group — 533 |
| | 536 Hops Left | 1 | Acknowledge — 534 |
| | | 1 | Zero for Standard message |
| | 536 Hops Left | 2 | Counted down on each retransmission |
| | 537 Max Hops | 2 | Maximum number of retransmissions allowed |
| 540 [ 541 | Command 1 | 8 | Command to execute |
| 540 [ 542 | Command 2 | 8 | |
| 560 | CRC | 8 | Cyclic Redundancy Check |

FIG. 7

| | DATA | BITS | CONTENTS |
|---|---|---|---|
| 510 | From Address | 24 | Transmitter unit address |
| 520 | To Address | 24 | For Direct messages: Destination unit address<br>For Broadcast messages: Device Type, Subtype, Firmware Version<br>For Group Broadcast messages: Group Number [0=>255] |
| 530 | Message Flags | | |
| | Message Type | 1 | Broadcast / NAK: 532 |
| | | 1 | Group 533 |
| | | 1 | Acknowledge 534 |
| 535 | Extended Flag | 1 | One for Extended message |
| 536 | Hops Left | 2 | Counted down on each retransmission |
| 537 | Max Hops | 2 | Maximum number of retransmissions allowed |
| 541 | Command 1 | 8 | Command to execute |
| 542 | Command 2 | 8 | |
| 550 | User Data 1 | 8 | User defined data |
| | User Data 2 | 8 | |
| | User Data 3 | 8 | |
| | User Data 4 | 8 | |
| | User Data 5 | 8 | |
| | User Data 6 | 8 | |
| | User Data 7 | 8 | |
| | User Data 8 | 8 | |
| | User Data 9 | 8 | |
| | User Data 10 | 8 | |
| | User Data 11 | 8 | |
| | User Data 12 | 8 | |
| | User Data 13 | 8 | |
| | User Data 14 | 8 | |
| 560 | CRC | 8 | Cyclic Redundancy Check |

FIG. 8

| BIT POSITION | FLAG | MEANING |
|---|---|---|
| 611 Bit 7 (Broadcast / NAK) | Message Type 610 | 100 = Broadcast Message<br><br>000 = Direct Message<br>001 = ACK of Direct Message<br>101 = NAK of Direct Message<br><br>110 = Group Broadcast Message<br>010 = Group-cleanup Direct Message<br>011 = ACK of Group-cleanup Direct Message<br>111 = NAK of Group-cleanup Direct Message |
| 612 Bit 6 (Group) | | |
| 613 Bit 5 (Acknowledge) | | |
| 621 Bit 4 | Extended 620 | 1 = Extended Message<br>0 = Standard Message |
| Bit 3 | Hops Left 630 | 00 = 0 message retransmissions remaining<br>01 = 1 message retransmission remaining<br>10 = 2 message retransmissions remaining<br>11 = 3 message retransmissions remaining |
| Bit 2 | | |
| Bit 1 | Max Hops 640 | 00 = Do not retransmit this message<br>01 = Retransmit this message 1 time maximum<br>10 = Retransmit this message 2 times maximum<br>11 = Retransmit this message 3 times maximum |
| Bit 0 | | |

FIG. 9

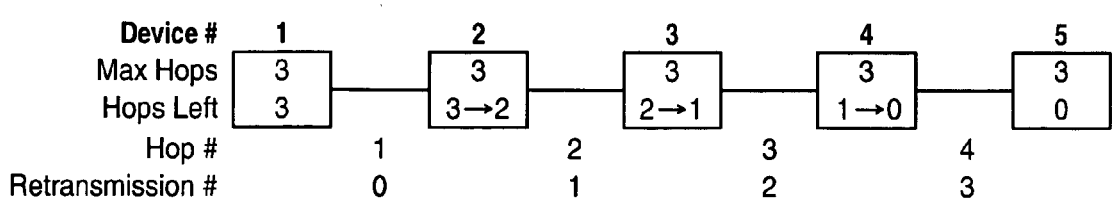

| Center Frequency | 904 MHz |
|---|---|
| Data Encoding Method | Mancester |
| Modulation Method | FSK |
| FSK Deviation | 64 KHz |
| FSK Symbol Rate | 38400 symbols per second |
| Data Rate | 19200 bits per second |
| Range | 150 feet outdoors |

| | | Timeslot | 1 | 2 | 3 | 4 | 5 | 6 | 7 | 8 |
|---|---|---|---|---|---|---|---|---|---|---|
| 1401 | Example 1 | Sender | T | | | | | | | |
| 1402 | Example 2 | Sender | T | | | | | | | |
| | | Repeater 1 | L | R | | | | | | |
| 1403 | Example 3 | Sender | T | L | L | L | L | | | |
| | | Repeater 1 | L | R | L | R | L | | | |
| | | Repeater 2 | L | L | R | L | L | | | |
| | | Repeater 3 | L | L | L | R | L | | | |
| 1404 | Example 4 | Sender | T | C | | | | | | |
| | | Recipient | L | A | | | | | | |
| 1405 | Example 5 | Sender | T | L | L | C | | | | |
| | | Repeater 1 | L | R | L | R | | | | |
| | | Recipient | L | L | A | L | | | | |
| 1406 | Example 6 | Sender | T | L | C | W | | | | |
| | | Repeater 1 | L | R | L | R | | | | |
| | | Recipient | L | W | A | L | | | | |
| 1407 | Example 7 | Sender | T | L | L | L | L | L | L | C |
| | | Repeater 1 | L | R | L | R | L | R | L | R |
| | | Repeater 2 | L | L | R | L | L | L | R | L |
| | | Repeater 3 | L | L | L | R | L | R | L | R |
| | | Recipient | L | L | L | L | A | L | R | L |

|  | Message | Meaning |
|---|---|---|
| 3310 | 00 00 3E 00 00 01 CF 01 00 | Switch sends Broadcast Group 1 On |
| 3320 | 00 00 3E 00 00 54 00 41 01 | Switch sends Direct On to Lamp A |
| 3330 | 00 00 54 00 00 3E 20 41 01 | Lamp A sends ACK to Switch |
| 3340 | 00 00 3E 00 00 51 00 41 01 | Switch sends Direct On to Lamp B |
| 3350 | 00 00 51 00 00 3E 20 41 01 | Lamp B sends ACK to Switch |

MESH NETWORK OF INTELLIGENT DEVICES COMMUNICATING VIA POWERLINE AND RADIO FREQUENCY

BACKGROUND OF THE INVENTION

1. Field of the Invention

The present invention relates to intelligent devices that are in communication with one another over one or more physical media, without needing a network controller.

2. Description of the Related Art

Communication among low-cost devices is useful in many applications. For example, in a home environment, room occupancy sensors, light switches, lamp dimmers, and a gateway to the Internet can all work together if they are in communication. A room in a home could be illuminated when people are present, or else an alarm could be sounded, depending on conditions established by a program running on a remote computer.

Networks of communicating devices can be constructed using many different physical communications media. Fiber optics, coaxial cable, twisted pair, and other structured wiring are commonly used for relatively high-performance local-area networks of PCs, printers and other computing devices. Infrared signals can be used at short range within a single room, as with handheld remote controls. Cell phones, pagers, and long-distance microwave communications use licensed radio-frequency (RF) bands.

When used to create networks of low-cost devices in existing buildings, such as a home, these physical media all have drawbacks. Structured wiring is not present in most homes already constructed, and adding it is disruptive and expensive. Infrared signals do not cover the whole house. Licensed RF normally requires payment of a subscription fee by users.

Existing powerline wiring and unlicensed RF bands do not have these problems. They are ubiquitous and can be freely used by anyone. They do, however, have other problems. Devices on the powerline must communicate despite the presence of substantial noise, attenuation by equipment powered by the line, and possible interference among devices. Devices using unlicensed RF bands must emit low power, and unlicensed bands are often crowded with multiple users.

Many existing devices that communicate on the powerline use a protocol known as X10 (see U.S. Pat. No. 4,200,862, dated Apr. 29, 1980). Signaling is accomplished using bursts of low-amplitude 120 KHz cycles synchronized to the powerline zero-crossings. Most X10 devices can either transmit or receive, but not both. X10 transmitters send commands without expecting a confirmation reply, so most control is open-loop. Users must typically configure an X10 system by manually setting mechanical "house code" and "unit code" switches on receiving devices.

With the addition of RF-to-X10 translation devices, commands originating in RF handheld remote controls can operate X10 receivers on the powerline. RF repeater devices can be used to increase the range of such a system. The RF remote control signaling protocols are typically independent of the X10 signaling protocol, and are more akin to signaling protocols used by infrared remote controls.

Improvements to basic X10 devices are available in the marketplace (see Smarthomepro Catalog, 63D, Spring 2004). Two-way communications, involving confirmation of commands and retries when necessary, enable much more reliable performance. Repeaters and phase bridges can solve signal attenuation problems. Use of nonvolatile storage, such as EEPROM, along with system controllers, can simplify system setup.

Powerline and RF signaling using spread-spectrum technology can be faster and more reliable than narrowband X10-like signaling. U.S. Pat. No. 5,090,024, dated Feb. 18, 1992, discloses such a system, and U.S. Pat. No. 5,777,544, dated Jul. 7, 1998, discloses spread spectrum in combination with narrowband signaling. Encoding and decoding of spread-spectrum signals is more complex than narrowband processing, and more complexity means higher relative cost.

Regardless of the method used for signaling on the physical media, systems comprising multiple devices must deal with the problem of mutual interference. Many solutions to this problem are in common usage.

In frequency-division multiplexing (FDM), narrowband devices hold conversations by tuning to different bands within the available spectrum. Spread-spectrum systems can use different spreading sequences for code-division multiplexing (CDM), or they can use different frequency-hopping patterns. Using these methods, each device in a network must know specifically how to connect with every other device. Broadcasting to all devices at once is not possible.

It is less complex, and more common, for all devices to share the same communications channel. Narrowband communication on the powerline or within an RF band is less costly than frequency-agile methods. Device interference is typically managed using time-division multiplexing (TDM) or carrier-sense multiple-access (CSMA) methods.

TDM allows each device on a medium to transmit data only within particular timeslots. Timeslots can be assigned in various ways.

IEEE 802.5 Token Ring networks dynamically assign timeslots to devices that wish to transmit by passing a special packet called a token. A device may transmit only when it possesses the token. After transmission is complete, the device releases the token to the next device.

U.S. Pat. Nos. 5,838,226, 5,848,054, 5,905,442, and 6,687,487, assigned to Lutron Electronics Company, disclose a lighting control system comprising masters, slaves and repeaters that communicate via RF and also on the powerline.

In particular, a number of RF repeater devices can be installed in a system to enhance signaling reliability. To avoid the problem of repeaters interfering with each other, the Lutron patents require an installer to set up one repeater as a main repeater, and others as second, third, and subsequent repeaters. This designation corresponds to a strict timeslot assignment for each repeater, such that a given repeater is only permitted to transmit during its respective preassigned timeslot. Furthermore, multiple slave devices in the system can transmit their status back to a master controller. These slave devices also use timeslots established during an installation procedure for each device.

CSMA networks are based on a listen-before-talk rule. Talkers break up messages into short packets. Talkers then listen for the medium to be quiet before sending a packet. Even so, data collisions can still occur, so CSMA-CD-CR (collision-detect, collision resolution) methods are often implemented. Collision-detection might involve closed-loop communications using special acknowledge/non-acknowledge (ACK/NAK) packets sent by packet addressees. Collision resolution might involve a transmission retry after a random delay.

The object of both TDM and CSMA systems is to allow only one device to use the available communications channel at any given time. Therefore, the signal strength on the channel depends on which single device is currently transmitting.

BRIEF SUMMARY OF THE EMBODIMENTS OF THE INVENTION

One object of the present invention is to enable simple, low-cost devices to be networked together using the powerline, radio-frequency bands, or both. Devices are peers, meaning that any device can transmit, receive, or repeat other messages according to a simple protocol, without requiring a master controller. The protocol encourages multiple devices on a single medium, in that adding more devices makes communication among devices more robust and reliable. On the powerline, devices according to the present invention are not only compatible with, but also enhance the performance of pre-existing X10 devices.

BRIEF DESCRIPTION OF THE SEVERAL VIEWS OF THE DRAWINGS

FIG. 2 shows how multiple powerline, RF and hybrid devices can be used in a network, and how powerline phase bridging is accomplished using RF.

FIG. 3 is a block diagram showing how any Insteon™ device can act as a master, slave, or both.

FIG. 4 shows the packet structure used for Insteon™ messages sent over the powerline.

FIG. 5 shows the structure of an Insteon™ message sent using RF.

FIG. 6 shows the 10 bytes of data contained in Insteon™ Standard messages.

FIG. 7 shows the 24 bytes of data contained in Insteon™ Extended messages.

FIG. 8 shows the meaning of the bits in the message flag byte.

FIG. 9 shows how Insteon™ devices retransmit messages.

FIG. 19 gives the specifications for Insteon™ RF signaling.

FIG. 20 shows how Insteon™ messages are transmitted, retransmitted, and acknowledged.

DETAILED DESCRIPTION OF THE EMBODIMENTS OF THE INVENTION

Introduction

Figure 1:
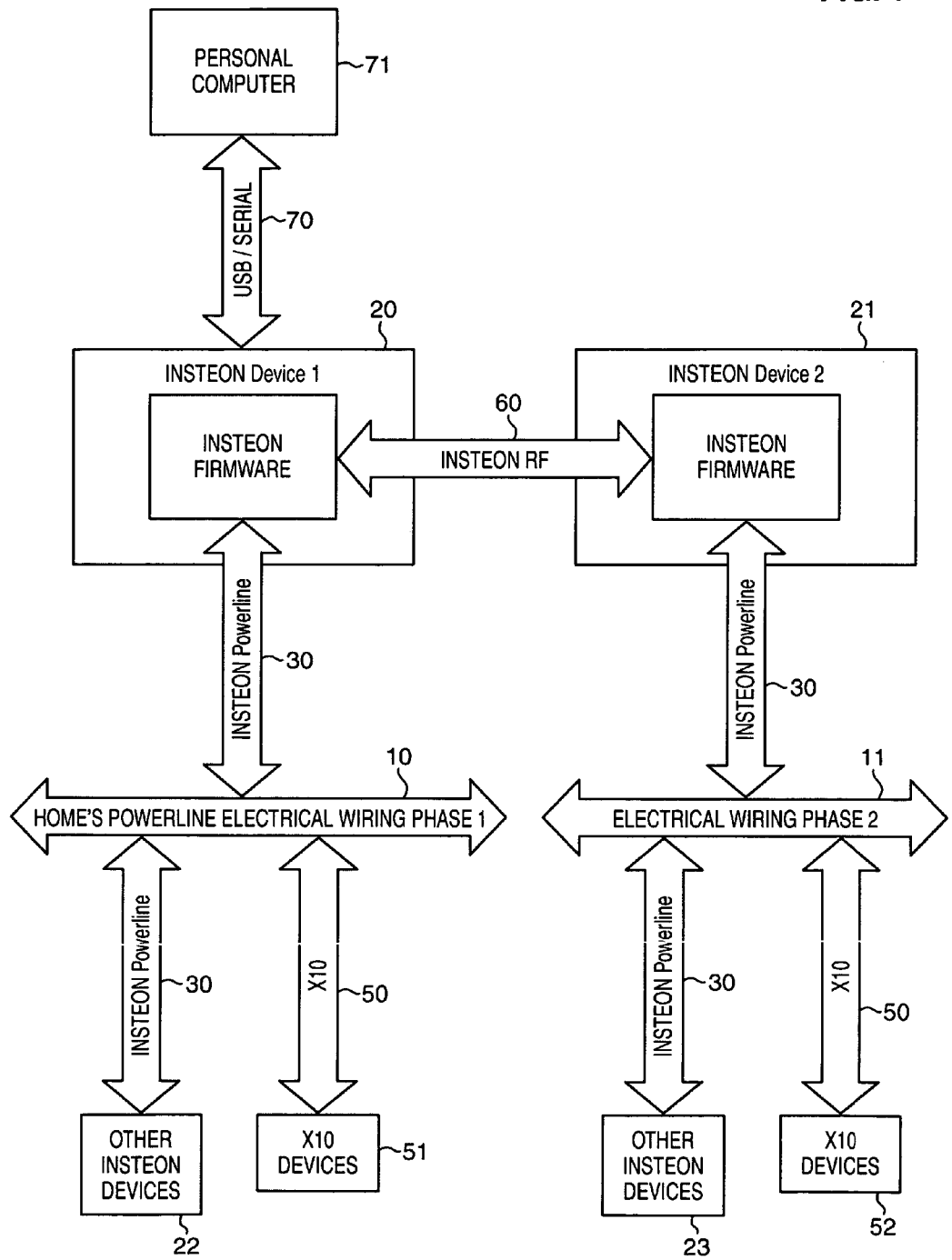
FIG. 1 is a block diagram of how devices according to the present invention, known as Insteon™ devices, are networked using the powerline, RF signaling, or both.

With reference now to the drawings, FIG. 1 shows a network of control and communication devices constructed according to the teachings of the present invention and hereinafter referred to as Insteon™ devices, INSTEON™ being a trademark of applicant's assignee. Electrical power is most commonly distributed to buildings and homes in North America as two-phase 220-volt alternating current (220 VAC). At the main junction box to the building, the three-wire 220 VAC powerline is split into two two-wire 110 VAC powerlines, known as Phase 1 and Phase 2. In FIG. 1, Phase 1 is designated 10 and Phase 2 is designated 11. Phase 1 wiring is typically used for half the circuits in the building, and Phase 2 is used for the other half.

In what follows, apparatus according to the invention will be designated Insteon™ devices. Insteon™ devices 20, 21, 22, and 23 are shown connected to powerline phases 10 and 11. Insteon™ devices communicate with each other over the powerline using the Insteon™ Powerline protocol 30, which will be described in detail in what follows.

Also shown connected to the powerline are X10 devices 51 and 52. X10 devices communicate over the powerline using the X10 protocol 50. The Insteon™ Powerline protocol 30 is compatible with the X10 protocol 50, meaning that Insteon™ devices can both listen and talk to X10 devices using the X10 protocol 50. X10 devices, however, are insensitive to the Insteon™ Powerline protocol 30.

Insteon™ devices may optionally comprise RF communication means, as is the case with Insteon™ devices 20 and 21. Insteon™ RF devices can communicate with other Insteon™ RF devices using the Insteon™ RF protocol 60. Insteon™ devices that can use both the Insteon™ Powerline protocol 30 and the Insteon™ RF protocol 60 solve a significant problem experienced by devices that only communicate via the powerline. Powerline signals on opposite powerline phases 10 and 11 are severely attenuated, because there is no direct circuit connection for them to travel over. A traditional solution to this problem is to connect a phase coupling device between the powerline phases, either by hardwiring it in at a junction box or by plugging it into a 220 VAC outlet. In the present invention, using Insteon™ devices capable of both Insteon™ Powerline 30 and Insteon™ RF 60 protocols automatically solves the powerline phase coupling problem whenever such devices are connected on opposite powerline phases. As shown in FIG. 1, Insteon™ device 20 can not only communicate via powerline with all devices on powerline phase 1, 10, but it can also communicate via powerline with all devices on powerline phase 2, 11, because it can communicate via Insteon™ RF protocol 60 with Insteon™ device 21, which in turn is directly connected to powerline phase 2, 11.

When suitably equipped with additional dedicated communication means, such as RS232, USB, or Ethernet, Insteon™ devices can also interface with computers and other digital equipment. As shown, Insteon™ device 20 can communicate with PC 71 using a serial link 70. Serial communications 70 is a means whereby networks of Insteon™ devices can bridge to networks of otherwise incompatible devices in a building, connect to computers, act as nodes on a local-area network (LAN), or get onto the global Internet. Coupled with the ability to download new software into Insteon™ devices, such connections allow networks of Insteon™ devices to perform very sophisticated new functions, including functions not envisioned at the time of manufacture or installation.

FIG. 2 shows how multiple Insteon™ devices, each of which is capable of repeating Insteon™ messages, form a reliable communications network. In the drawing, devices 110 and 111, known as SignaLinc™ devices, are capable of both Insteon™ powerline and Insteon™ RF communications. Devices 120, 121, 122, and 123 are only capable of Insteon™ RF communications. The remaining devices, 31, 32, 33, 34 and 40, 41, 42, 43, are only capable of Insteon™ powerline communications.

Every Insteon™ device is capable of repeating Insteon™ messages, using the Insteon™ protocol according to the present invention, as described hereinafter in detail. Adding more devices increases the number of available pathways for messages to travel. Path diversity results in a higher probability that a message will arrive at its intended destination, so the more Insteon™ devices in a network, the better.

As an example, suppose RF device 120 desires to send a message to RF device 123, but RF device 123 is out of range. The message will still get through, however, because devices within range of device 120, say devices 110 and 121, will receive the message and repeat it to other devices within range of themselves. In the drawing, device 110 might reach devices 121,111, and 122, and devices 111 and 121 might be within range of the intended recipient, device 123. Therefore, there are many ways for a message to travel: device 120 to 121 to 123 (2 hops), device 120 to 110 to 111 to 123 (3 hops), device 120 to 110 to 121 to 111 to 123 (4 hops) are some examples.

It should be clear that unless there is some mechanism for limiting the number of hops that a message may take to reach its final destination, messages might propagate forever within the network, in a nested series of recurring loops. Network saturation by repeating messages is known as a "data storm." The Insteon™ protocol avoids this problem by limiting the maximum number of hops an individual message may take to some small number, such as four.

FIG. 2 also shows how path diversity on the powerline has a similar beneficial effect. For example, as shown, powerline device 40 may not be able to communicate directly with device 43 because of signal attenuation problems or because a direct path through the electric wiring does not exist. But a message from device 40 will still reach device 43 by taking a path via devices 40 to 111 to 43 (2 hops), or a path 40 to 41 to 111 to 43 (3 hops), or a path 40 to 41 to 42 to 43 (4 hops).

Finally, FIG. 2 shows how messages can travel among powerline devices that are installed on different phases of a building's wiring. To accomplish phase bridging, at least one Insteon™ hybrid powerline/RF device must be installed on each powerline phase. In the drawing, SignaLinc™ device 110 is installed on phase A and SignaLinc™ device 111 is installed on phase B. Direct RF paths between devices 110 to 111 (1 hop), or indirect paths using 110, 121 and 111 or 110, 122 and 111 (2 hops) allow messages to propagate between the powerline phases.

All Insteon™ devices are peers, meaning that any device can act as a master (sending messages), slave (receiving messages), or repeater (relaying messages). This relationship is illustrated in FIG. 3, where Insteon™ device 210, acting as a master, sends messages to multiple Insteon™ devices acting as slaves 220, 221, and 222. Multiple Insteon™ devices acting as masters 230, 231, and 232 can also send messages to a single Insteon™ device acting as a slave 221. Any Insteon™ device can repeat messages by acting as both a slave and a master, as with SwitchLinc™ device 250, which is shown relaying a message from ControLinc™ device 240 acting as a master to LampLinc™ device 260 acting as a slave.

Insteon™ Messages

Insteon™ devices communicate with each other by sending messages. Messages sent over the powerline are broken up into packets, with each packet sent in conjunction with a zero-crossing of the voltage on the powerline. As shown in FIG. 4, there are two kinds of Insteon™ messages, Standard Messages 310 and Extended Messages 320. Standard Messages comprise five packets and Extended Messages comprise eleven packets. Each packet contains 24 bits of information, but the information is interpreted in two different ways. A Standard Packet 330 appears as the first packet in an Insteon™ message, as shown by the symbol 331 in Standard Message 310 and Extended Message 320. The remaining packets in a message are Long Packets 340, as shown by symbols 341 in Standard Message 310 and Extended Message 320.

Powerline packets begin with a series of Sync Bits. There are eight Sync Bits 332 in a Standard Packet 330 and there are two Sync Bits 342 in a Long Packet 340. Following the Sync Bits are four Start Code Bits, shown as 333 in the Standard Packet 330 and as 343 in the Long Packet 340. The remaining bits in a packet are Data Bits. There are twelve Data Bits 334 in a Standard Packet 330, and there are eighteen Data Bits 344 in a Long Packet 340.

The total number of Data Bits in a Standard Message 310 is 12+(4×18), which is 84, or 10½ bytes. The last four data bits in a Standard Message are ignored, so the usable data is ten bytes. The total number of Data Bits in an Extended Message 320 is 12+(10×18), which is 192, or 24 bytes.

FIG. 5 shows the contents of Insteon™ messages sent using RF. Because Insteon™ RF messaging is much faster than powerline messaging, there is no need to break up RF messages into smaller packets. An RF Standard message is shown as 410 and an RF Extended message is shown as 420. In both cases the message begins with two Sync Bytes 411 or 421, followed by one Start Code Byte 412 or 422. RF Standard messages 410 contain ten Data Bytes (80 bits) 413, and RF Extended messages 420 contain twenty-four Data Bytes (192 bits) 423.

The significance of the Data Bytes is given in FIG. 6 for a Standard message, and in FIG. 7 for an Extended message. Comparing the two figures, the only difference is that the Extended message in FIG. 7 contains fourteen User Data Bytes 550 not found in the Standard message in FIG. 6. The remaining information fields for both types of message are identical, and in the figures the number callouts are the same, so the following explanation will be valid for both FIG. 6 and FIG. 7.

The bytes in an Insteon™ message are transmitted most-significant byte first, and the bits are transmitted most-significant bit first.

The first field in an Insteon™ message is the From Address 510, a 24-bit (3-byte) number that uniquely identifies the Insteon™ device originating the message being sent. There are 16,777,216 possible Insteon™ devices identifiable by a 3-byte number. This number can be thought of as an ID Code or, equivalently, as an address for an Insteon™ device. During manufacture, a unique ID Code is stored in each device in nonvolatile memory.

The second field in an Insteon™ message is the To Address 520, also a 24-bit (3-byte) number. Most Insteon™ messages are of the Direct, or Point-to-Point (P2P), type, where the intended recipient is another single, unique Insteon™ device. The third field, the Message Flags byte 530, determines the type of Insteon™ Message. If the message is indeed Direct, the To Address 520 contains the 3-byte unique ID Code for the intended recipient. However, Insteon™ messages can also be sent to all recipients within range, as Broadcast messages, or they can be sent to all members of a group of devices, as Group Broadcast messages. In the case of Broadcast messages, the To Address field 520 contains a Device Type byte, a Device Subtype byte, and a Firmware Version byte. For Group Broadcast messages, the To Address field 520 contains a Group Number. Group Numbers can range from 0 to 255, given by one byte, so the two most-significant bytes of the three-byte field will be zero.

The third field in an Insteon™ message, the Message Flags byte 530, not only signifies the Message Type but it also contains other information about the message. The three most-significant bits, the Broadcast/NAK flag 532 (bit 7), the Group flag 533 (bit 6), and the ACK flag 534 (bit 5) together indicate the Message Type 531. Message Types will be explained in more detail below. Bit 4, the Extended flag 535, is set to one if the message is an Extended message, i.e. contains 14 User Data bytes, or else it is set to zero if the message is a Standard message containing no User Data. The low nibble contains two two-bit fields, Hops Left 536 (bits 3 and 2) and Max Hops 537 (bits 1 and 0). These two fields control message retransmission as explained below.

The fourth field in an Insteon™ message is a two-byte Command 540, made up of Command 1 541 and Command 2 542. The usage of this field depends on the Message Type as explained fully below.

Only if the message is an Extended message, with the Extended Flag 535 set to one, will it contain the fourteen-byte User Data field 550, as shown in FIG. 7. User Data can be arbitrarily defined. If more than 14 bytes of User Data need to be transmitted, multiple Insteon™ Extended messages will have to be sent. Users can define a packetizing method for their data so that a receiving device can reliably reassemble long messages. Encrypting User Data can provide private, secure communications for sensitive applications such as security systems.

The last field in an Insteon™ message is a one-byte CRC, or Cyclic Redundancy Check 560. The Insteon™ transmitting device computes the CRC over all the bytes in a message beginning with the From Address 510. Methods for computing a CRC are well known in the art. Insteon™ uses a software-implemented 7-bit linear-feedback shift register with taps at the two most-significant bits. The CRC covers 9 bytes for Standard messages and 23 bytes for Extended messages. An Insteon™ receiving device computes its own CRC over the same message bytes as it receives them. If the message is corrupt, the receiver's CRC will not match the transmitted CRC. Detection of message integrity allows for highly reliable, verified communications. The Insteon™ ACK/NAK (acknowledge, non-acknowledge) closed-loop messaging protocol based on this detection method is disclosed below.

FIG. 8 enumerates the meaning of the bit fields in the Message Flags byte 530 of FIG. 6 and FIG. 7. The Broadcast/NAK flag 611 (bit 7), the Group flag 612 (bit 6), and the ACK flag 613 (bit 5) together denote the eight possible Message Types 610.

To fully understand the various Message Types, consider that there are four classes of Insteon™ messages: Broadcast, Group Broadcast, Direct, and Acknowledge.

Broadcast messages contain general information with no specific destination. They are directed to the community of devices within range. Broadcast messages are not acknowledged.

Group Broadcast messages are directed to a group of devices that have previously been linked to the transmitter. Group Broadcast messages are not acknowledged directly. They only exist as a means for speeding up the response to a command intended for multiple devices. After sending a Group Broadcast message to a group of devices, the transmitter then sends a Direct "Group-cleanup" message to each member of the group individually, and waits for an acknowledgement back from each device.

Direct messages, also referred to as Point-to-Point (P2P) messages, are intended for a single specific recipient. The recipient responds to Direct messages by returning an Acknowledge message.

Acknowledge messages (ACK or NAK) are messages from the recipient to the initiator in response to a Direct message. There is no acknowledgement to a Broadcast or Group Broadcast message. An ACK or NAK message may contain status information from the acknowledging device.

Referring again to FIG. 8, note that the Broadcast/NAK flag 611 will be set whenever the message is a Broadcast message or a Group Broadcast message. In those two cases the Acknowledge flag 613 will be clear. If the Acknowledge flag 613 is set, the message is an Acknowledge message. In that case the Broadcast/NAK flag 611 will be set when the Acknowledge message is a NAK, and it will be clear when the Acknowledge message is an ACK.

The Group flag 612 will be set to indicate the message is a Group Broadcast message or part of a Group-cleanup conversation. This flag will be clear for general Broadcast messages and Direct conversations.

Now all eight Message Types 610 can be enumerated as follows, where the three-bit field is given in the order Bit 7, Bit 6, Bit 5. Broadcast messages are Message Type 100. Direct (P2P) messages are 000. An ACK of a Direct message is 001, and a NAK of a Direct message is 101. A Group Broadcast message is 110. Group Broadcasts are followed up by a series of Group-cleanup Direct messages 010 to each member of the group. Each recipient of a Group-cleanup Direct message will return an acknowledgement with a Group-cleanup ACK 011 or a Group-cleanup NAK 111.

Bit 4, 621 in FIG. 8, is the Extended Message flag 620. As disclosed above, this flag is set for 24-byte Extended messages that contain a 14-byte User Data field, and the flag is clear for 10-byte Standard messages that do not contain User Data.

The remaining two fields in FIG. 8, Max Hops 640 and Hops Left 630, manage message retransmission. As disclosed above, all Insteon™ devices are capable of repeating messages by receiving and retransmitting them. Without a mechanism for limiting the number of times a message can be retransmitted, an uncontrolled "data storm" of endlessly repeated messages could saturate the network. To solve this problem, Insteon™ messages are originated with the 2-bit Max Hops field 640 set to a value of 0, 1, 2, or 3, and the 2-bit Hops Left field 630 set to the same value. A Max Hops value of zero tells other devices within range not to retransmit the message. A higher Max Hops value tells devices receiving the message to retransmit it depending on the Hops Left field 630. If the Hops Left value is one or more, the receiving device decrements the Hops Left value by one, then retransmits the message with the new Hops Left value. Devices that receive a message with a Hops Left value of zero will not retransmit that message. Also, a device that is the intended recipient of a message will not retransmit the message, no matter what the Hops Left value is.

Note that the designator "Max Hops" really means maximum retransmissions allowed. All Insteon™ messages "hop" at least once, so the value in the Max Hops field 640 is one less than the number of times a message actually hops from one device to another. Since the maximum value in this field is three, there can be four actual hops, comprising the original transmission and three retransmissions. Four hops can span a chain of five devices. This situation is shown schematically in FIG. 9.

Figure 10:
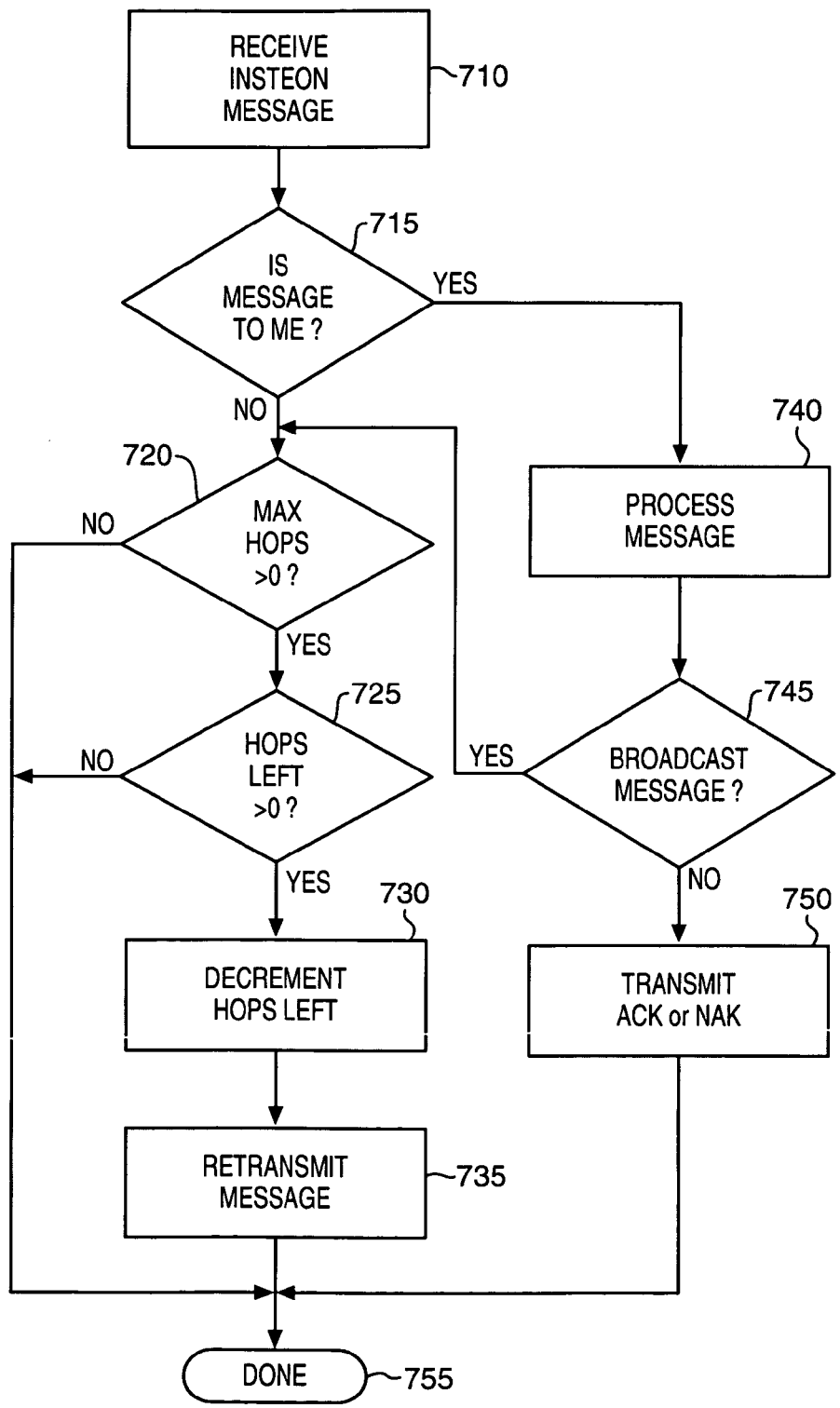
FIG. 10 is a flowchart showing how Insteon™ devices receive messages.

The flowchart in FIG. 10 shows how an Insteon™ device receives messages and determines whether to retransmit them or process them. When an Insteon™ device receives a message in step 710, it determines in step 715 whether it needs to process the message or not. A device will need to process Direct messages if the device is the addressee, Group Broadcast messages if the device is a member of the group, and all Broadcast messages. If the message needs to be processed, the device does so in step 740, and then if the message is found to be a Direct or Direct Group-cleanup message in step 745, the device sends an Acknowledge message back to the message originator in step 750 and ends the task at step 755. If instead the message is found to be a Broadcast or Group Broadcast message in step 745, processing resumes at step 720 to determine if the message should be retransmitted. In step 720 the Max Hops bit field of the Message Flags byte is tested. If the Max Hops value is zero, processing is finished at step 755, else the Hops Left bit field is tested at step 725. If there are zero Hops Left, processing is finished at step 755, else the device decrements the Hops Left value by one at step 730 and retransmits the message at step 735.

Figure 11:
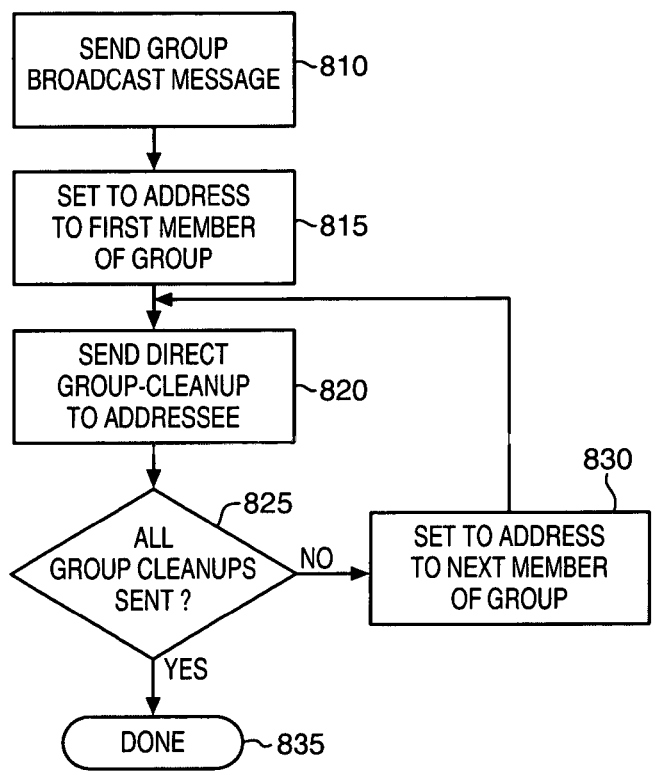
FIG. 11 is a flowchart showing how messages are transmitted to groups of Insteon™ devices.

The flowchart in FIG. 11 shows how an Insteon™ device sends messages to multiple recipient devices in a group. Group membership is stored in a database in the device following a previous enrollment process. In step 810 the device first sends a Group Broadcast message intended for all members of a given group. The Message Type field in the Message Flags byte is set to 110 to signify a Group Broadcast message, and the To Address field is set to the group number, which can range from 0 to 255. Following the Group Broadcast message the transmitting device sends a Direct Group-cleanup message individually to each member of the group in its database. At step 815 the device first sets the message To Address to that of the first member of the group, then it sends a Direct Group-cleanup message to that addressee at step 820. If Group-cleanup messages have been sent to every member of the group, as determined at step 825, transmission is finished at step 835. Otherwise, the device sets the message To Address to that of the next member of the group and sends the next Group-cleanup message to that addressee at step 820.

Figure 12:
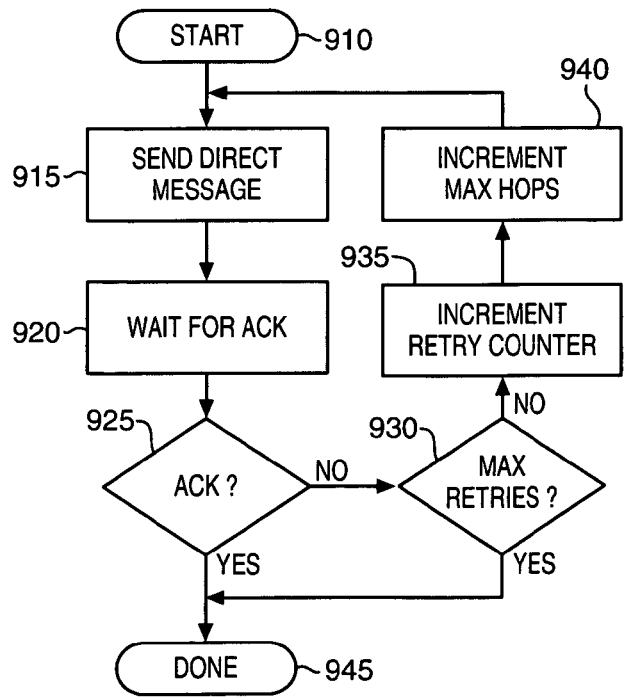
FIG.12 is a flowchart showing how Insteon™ devices transmit Direct messages with retries.

The flowchart in FIG. 12 shows how Direct messages can be retried multiple times if an expected ACK is not received from the addressee. Beginning at step 910 a device sends a Direct or a Direct Group-cleanup message to an addressee at step 915. At step 920 the device waits for an Acknowledge message from the addressee. The exact timing for this step is given below. If at step 925 an Acknowledge message is received and it contains an ACK with the expected status, the process is finished at step 945. If at step 925 an Acknowledge message is not received, or if it is not satisfactory, a Retry Counter is tested at step 930. If the maximum number of retries has already been attempted, the process fails at step 945. Insteon™ devices default to a maximum number of retries of five. If fewer than five retries have been tried at step 930 the device increments its Retry Counter at step 935. At step 940 the device will also increment the Max Hops field in the Message Flags byte, up to a maximum of three, in an attempt to achieve greater range for the message by retransmitting it more times by more devices. The message is sent again at step 915.

Figure 13:
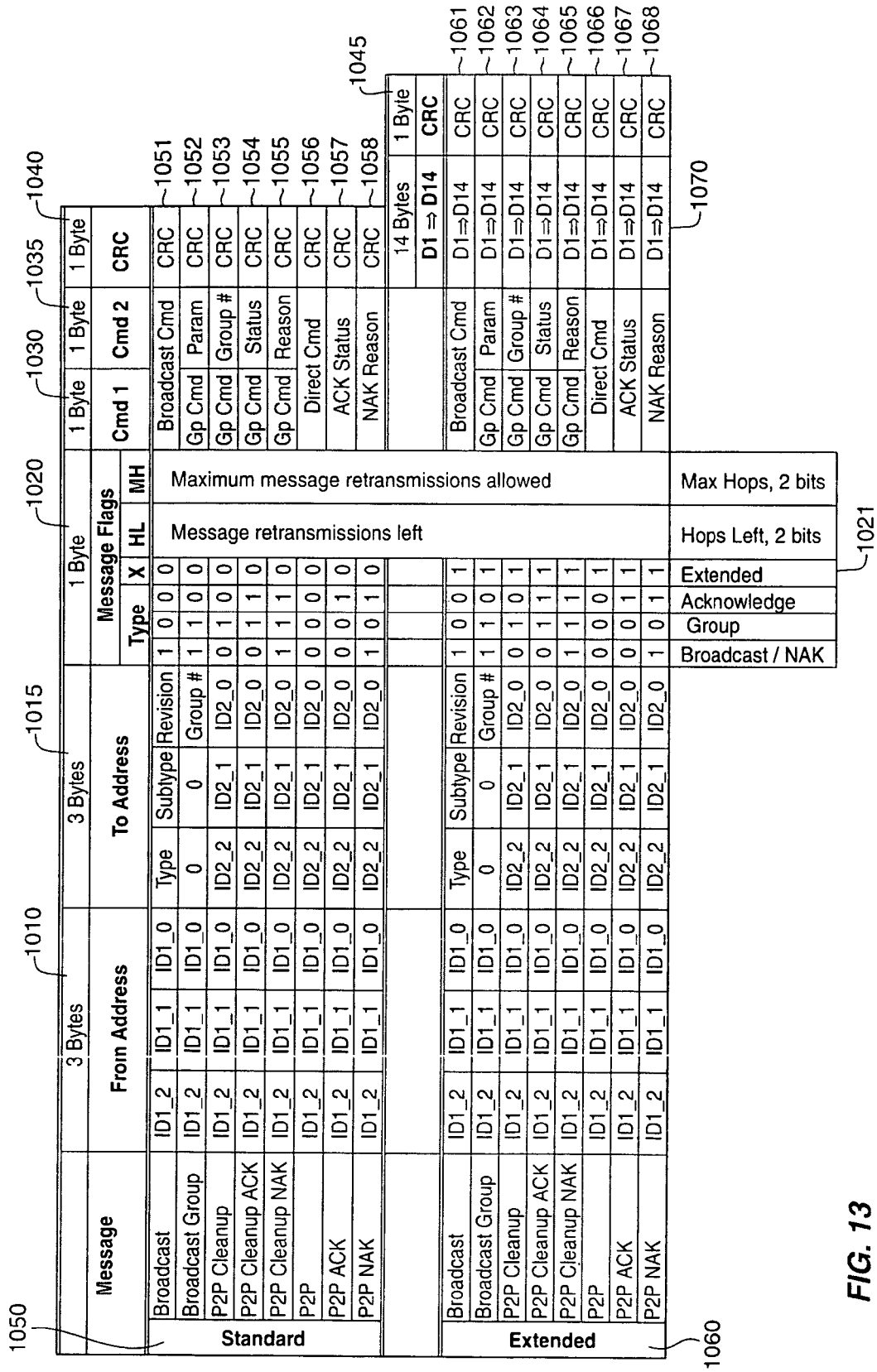
FIG. 13 shows all of the types of Insteon™ messages.

FIG. 13 summarizes all the fields in every type of Insteon™ message. Standard messages 1050 are enumerated in lines 1051 through 1058 and Extended messages are enumerated in lines 1061 through 1068. The figure clearly shows that the only difference between Standard and Extended messages is that the Extended Flag 1021 is clear for Standard messages and set for Extended messages, and Extended messages possess a 14-byte User Data field 1070. The From Address 1010, the To Address 1015, the Message Flags 1020, and the CRCs 1040 and 1045 are as explained above.

The Command 1 field 1030 and the Command 2 field 1035 contain different information for each of the eight types of Insteon™ messages 1051 through 1058 or 1061 through 1068. In the case of Broadcast messages 1051 or 1061, the two fields together contain a 2-byte command chosen from a possible 65,536 commands suitable for sending to all devices at once. For example, a Broadcast command could direct ail devices to enter a system setup mode. Every receiving device contains a database of Broadcast commands that it is capable of executing.

In the case of Point-to-point (Direct) messages 1056 or 1066, the two Command fields 1030 and 1035 together comprise a 2-byte command chosen from a possible 65,536 commands suitable for sending to a single device. For example, a Direct command could tell a LampLinc™ lamp control device to turn on the lamp plugged into it. Every receiving device contains a database of Direct commands that it is capable of executing.

In the interest of maximum system reliability, the Insteon T protocol requires that Direct messages be acknowledged. A receiving device can issue an acknowledgement of successful communication and completion of a task, i.e. an ACK as shown in line 1057 or 1067. Otherwise the receiving device can issue a NAK as in line 1058 or 1068, which indicates some kind of failure. If a receiving device fails to send an ACK or a NAK back to the originating device, the originating device can retry the message as shown in FIG. 12.

To respond with an ACK or a NAK, a receiving device swaps the From Address 1010 and the To Address 1015 in the message it received, and sets the Message Type bits to 001 for an ACK or 101 for a NAK. Depending on the command received in the Command fields 1030 and 1035, the receiving device composes a 2-byte status response code for an ACK or else a 2-byte reason code for a NAK, which it inserts in the Command fields 1030 and 1035. These response codes are created according to a set of rules encoded in the software of the device. For example, if a lamp dimmer receives a command to set the lamp to a certain brightness level, issued as a Set Brightness code in the Command 1 field 1030 and the desired brightness level as one of 256 values in the Command 2 field 1035, the dimmer could respond with an ACK message containing the same two bytes in the Command fields 1030 and 1035 to indicate successful execution of the command.

The remaining Insteon™ message types are for dealing with groups of devices. Group Broadcast messages exist as a performance enhancement. While it is true that all the members of a group of devices could be sent individual Direct messages with the same command (to turn on, for example), it would take a noticeable amount of time for all the messages to be transmitted in sequence. The members of the group would not execute the command all at once, but rather in the order received. Insteon™ solves this problem by first sending a Group Broadcast message, then following it up with individual Direct "Group-cleanup" messages.

Group Broadcast messages, shown in lines 1052 and 1062 of FIG. 13, contain a Group Number in the To Address field 1015, and a Group Command in the Command fields 1030 and 1035. During the Direct Group-cleanup messages that will follow, the Group Command will be sent in the Command 1 field 1030 and the Group Number will be sent in the Command 2 field 1035. These are both one-byte fields, so there can only be 256 Group Commands and only 256 Group Numbers. This is a reasonable limitation given that Group Broadcasts only need to be used where rapid, synchronous response of multiple devices is an issue. In any case, the numerical limitation can be overcome by using Extended messages and embedding additional commands or group membership criteria in the User Data field.

Recipients of a Group Broadcast message check the Group Number in the To Address field 1015 against their own group memberships recorded in a database. This database, preferably in nonvolatile memory, is established during a prior group enrollment process. If the recipient is a member of the group being broadcast to, it executes the command in the Command 1 field 1030. Since the Group Command only occupies one byte, the other byte in field 1035 can be a parameter or a subcommand.

Group Broadcast command recipients can then expect a Direct individually-addressed Group-cleanup message. If the recipient has already executed the Group Command in field 1030, it will not execute the command a second time.

However, if the recipient missed the Group Broadcast command for any reason, it will not have executed it, so it will execute the command after receiving the Direct Group-cleanup message.

After receiving the Direct Group-cleanup message and executing the Group Command, the recipient device will respond with a Group-cleanup ACK message, or if something went wrong, a Group-cleanup NAK message. In both cases the Command 1 field 1030 will contain the same one-byte Group Command received during the Direct Group-cleanup message. The other byte in the Command 2 field 1035 will contain a one-byte ACK Status code in the case of an ACK, or a one-byte NAK Reason code in the case of a NAK. These one-byte codes can be a subset of the corresponding two-byte codes used in Direct ACK and Direct NAK messages.

Insteon™ Signaling

Insteon™ devices communicate on the powerline by adding a signal to the powerline voltage. In the United States, powerline voltage is 110 VAC RMS, alternating at 60 Hz. These values will be used in the disclosure that follows, although those skilled in the art will be able to adjust the results for other powerline standards.

An Insteon™ powerline signal uses a carrier frequency of 131.65 KHz, with a nominal amplitude of 4.64 volts peak-to-peak into a 5 ohm load. In practice, the impedance of powerlines varies widely, depending on the powerline configuration and what is plugged into it, so measured Insteon™ powerline signals can vary from sub-millivolt to more than 5 volts.

Insteon™ data is modulated onto the 131.65 KHz carrier using binary phase-shift keying, or BPSK, chosen for reliable performance in the presence of noise.

Figure 14:
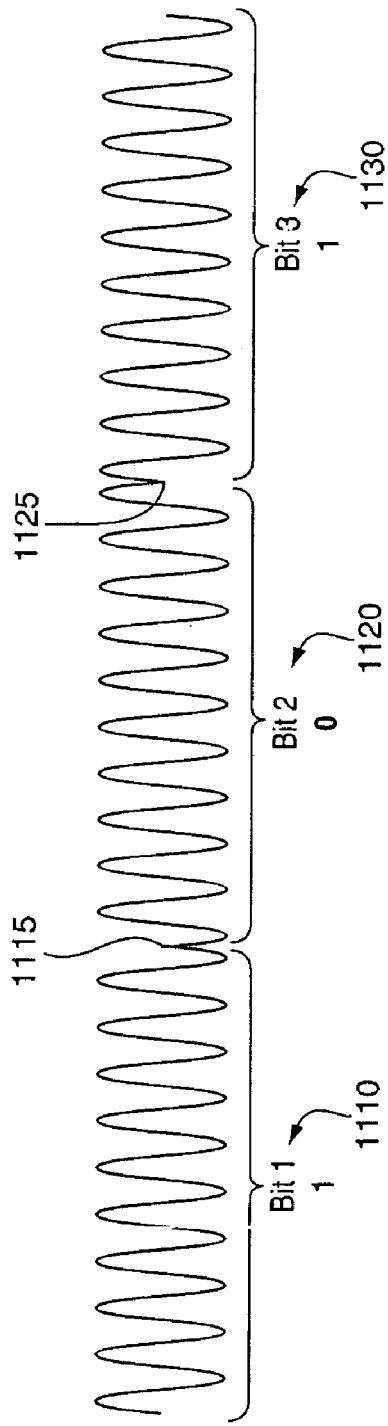
FIG. 14 shows a BPSK Insteon™ signal.

FIG. 14 shows an Insteon™ 131.65 KHz powerline carrier signal with alternating BPSK bit modulation. Insteon™ uses ten cycles of carrier for each bit. Bit 1 1110, interpreted as a one, begins with a positive-going carrier cycle. Bit 2 1120, interpreted as a zero, begins with a negative-going carrier cycle. Bit 3 1130, begins with a positive-going carrier cycle, so it is interpreted as a one. Note that the sense of the bit interpretations is arbitrary. That is, ones and zeros could be reversed as long as the interpretation is consistent. Phase transitions only occur when a bitstream changes from a zero to a one or from a one to a zero. A one followed by another one, or a zero followed by another zero, will not cause a phase transition. This type of coding is known as NRZ, or non-return to zero.

FIG. 14 shows abrupt phase transitions of 180 degrees at the bit boundaries 1115 and 1125. Abrupt phase transitions introduce troublesome high-frequency components into the signal's spectrum. Phase-locked detectors can have trouble tracking such a signal. To solve this problem, Insteon™ uses a gradual phase change to reduce the unwanted frequency components.

Figure 15:
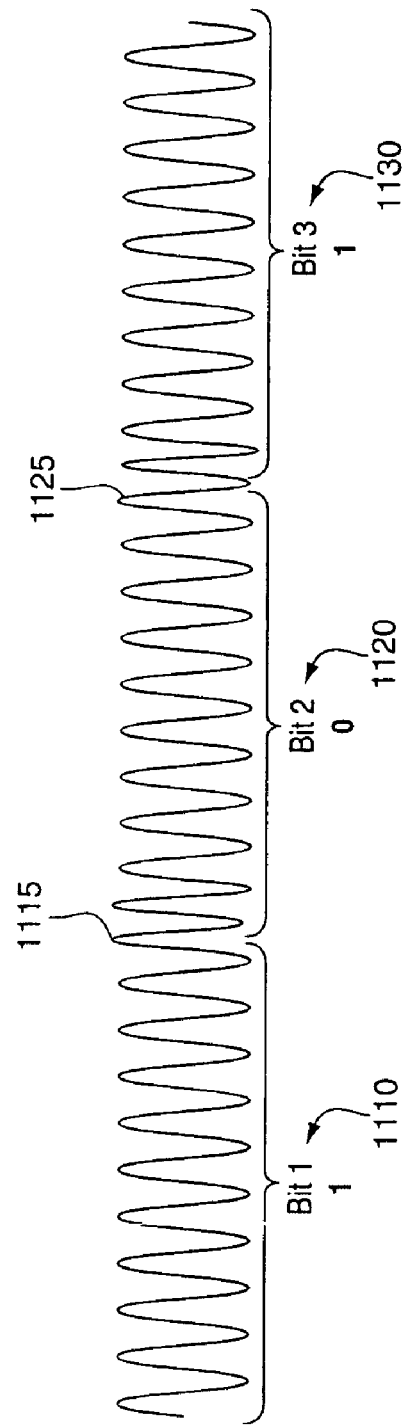
FIG. 15 shows a BPSK Insteon™ signal with transition smoothing.

FIG. 15 shows the same BPSK signal with gradual phase shifting. The transmitter introduces the phase change by inserting 1.5 cycles of carrier at 1.5 times the 131.65 KHz frequency. Thus, in the time taken by one cycle of 131.65 KHz, three half-cycles of carrier will have occurred, so the phase of the carrier is reversed at the end of the period due to the odd number of half-cycles. Note the smooth transitions 1115 and 1125 in the figure.

All Insteon™ powerline packets contain 24 bits, as was shown in FIG. 4. Since a bit takes ten cycles of 131.65 KHz carrier, there are 240 cycles of carrier in an Insteon™ packet, meaning that a packet lasts 1.823 milliseconds. The powerline environment is notorious for uncontrolled noise, especially high-amplitude spikes caused by motors, dimmers and compact fluorescent lighting. This noise is minimal during the time that the current on the powerline reverses direction, a time known as the powerline zero crossing. Therefore, Insteon™ packets are transmitted near the zero crossing, as shown in FIG. 16.

Figure 16:
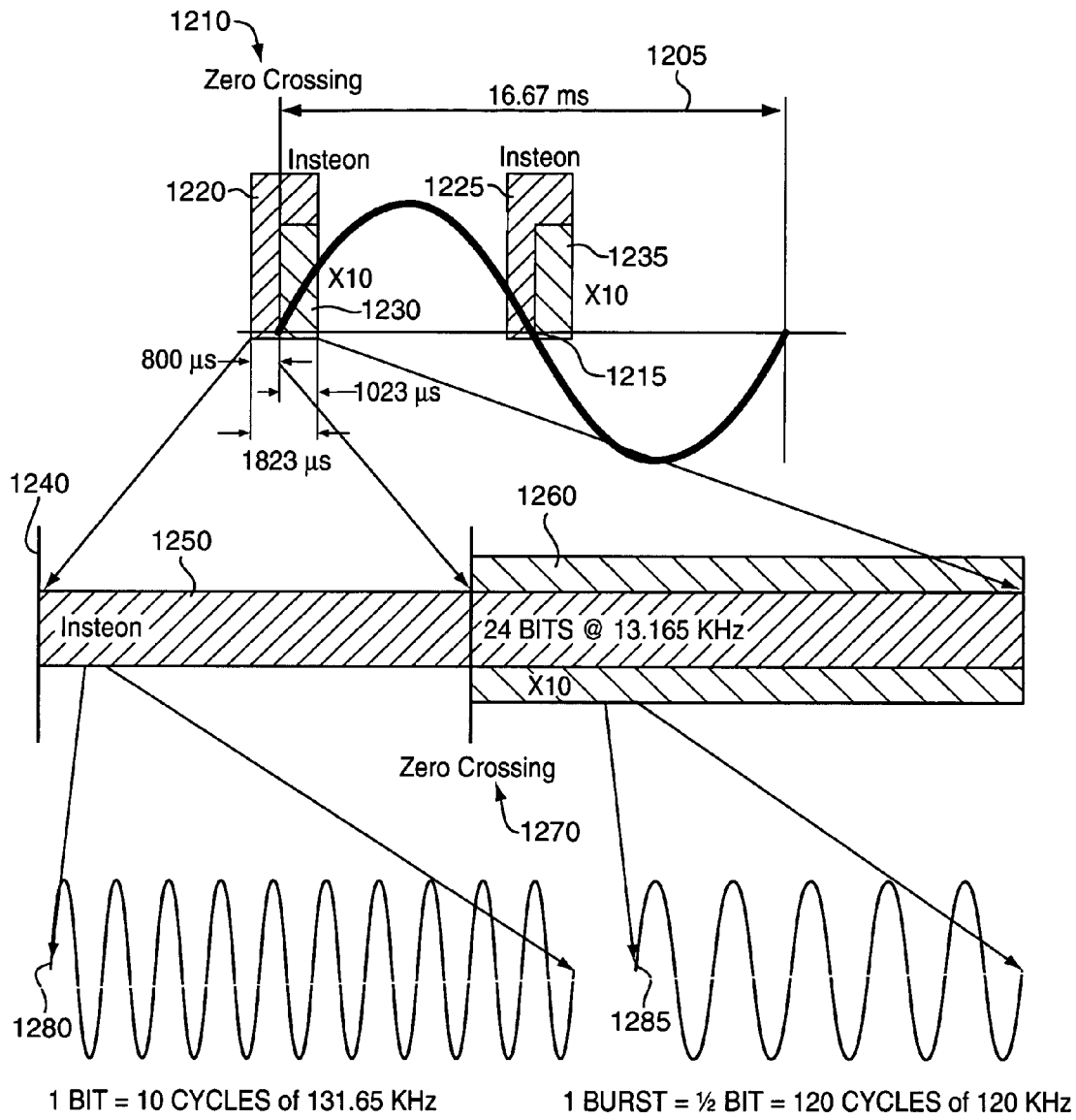
FIG. 16 shows how both Insteon™ and X10 signaling are applied to the powerline.

FIG. 16 shows a single powerline cycle 1205, which possesses two zero crossings 1210 and 1215. An Insteon™ packet 1220 is shown at zero crossing 1210 and a second Insteon™ packet 1225 at zero crossing 1215. Insteon™ packets begin 800 microseconds before a zero crossing and last until 1023 microseconds after the zero crossing.

FIG. 16 also shows how X10 signals are applied to the powerline. X10 is the signaling method used by many devices already deployed around the world. Interoperability with X10 is a major feature of Insteon™ devices. Insteon™ devices can receive X10 signals, send X10 signals, and boost X10 signals. The X10 signal uses a burst of approximately 120 cycles of 120 KHz carrier beginning at the powerline zero crossing and lasting about 1000 microseconds. A burst followed by no burst signifies a one bit and no burst followed by a burst signifies a zero bit. An X10 message begins with two bursts in a row followed by a one bit, followed by nine data bits. FIG. 16 shows two X10 bursts 1230 and 1235 at the two zero crossings 1210 and 1215.

Note that the X10 specification also calls for two additional bursts one-third and two-thirds of the way through a half-cycle of power. These points correspond to the zero-crossings of the other two phases of three-phase power. Insteon™ is insensitive to those additional X10 bursts and does not transmit them when sending X10.

An expanded view 1240 of an Insteon™ packet 1250 is shown with an X10 burst 1260 superimposed. The X10 signal 1260 begins at the zero crossing 1270, 800 microseconds after the beginning of the Insteon™ packet 1250. Both signals end at approximately the same time, 1023 microseconds after the zero crossing. Insteon™ devices achieve compatibility with X10 by listening for an Insteon™ signal beginning 800 microseconds before the zero crossing. Insteon™ receivers implemented in software can be very sensitive, but at the cost of having to receive a substantial portion of a packet before being able to validate that a true Insteon™ packet is being received. Reliable validation may not occur until as much as 450 microseconds after the zero crossing, although an Insteon™ device will still begin listening for a possible X10 burst right at the zero crossing. If at the 450-microsecond mark the Insteon™ receiver validates that it is not receiving an Insteon™ packet but that there is an X10 burst present, the Insteon™ receiver will switch to X10 mode and listen for a complete X10 message over the next 11 powerline cycles. If the Insteon™ device detects that it is receiving an Insteon™ packet, it will remain in Insteon™ mode and listen for X10 until it receives the rest of the complete Insteon™ message.

Optionally, an Insteon™ device can boost an X10 signal by retransmitting it, although X10 bursts will be retransmitted up to 450 microseconds late if the Insteon™ receiver is implemented in software. Because X10 receivers perform better with stronger signals, but are relatively insensitive to exact signal timing, overall X10 performance is improved by X10 signal boosting even if the X10 bursts are late.

Insteon™ devices implemented using substantially more signal detection hardware, as can be achieved in an application-specific integrated circuit (ASIC) with second-order phase-locked loops, can detect the presence of valid Insteon™ packets during the 800 microseconds before the zero crossing. Able to independently and simultaneously listen for X10, such devices can boost X10 bursts after only a short hardware X10 detector delay.

FIG. 16 also shows that the raw bitrate for Insteon™ is much faster for Insteon™ than for X10. An Insteon™ bit 1280 requires ten cycles of 131.65 KHz carrier, or 75.96 microseconds, whereas an X10 bit requires two 120-cycle bursts 1285 of 120 KHz. One X10 burst 1285 takes 1000 microseconds, but since each X10 burst is sent at a zero crossing, it takes 16,667 microseconds to send the two bursts in a bit, resulting in a sustained bitrate of 60 bits per second. Insteon™ packets comprise 24 bits, and an Insteon™ packet can be sent during each zero crossing, so the nominal sustained bitrate for Insteon™ is 2880 bits per second, 48 times faster than X10.

Figure 17:
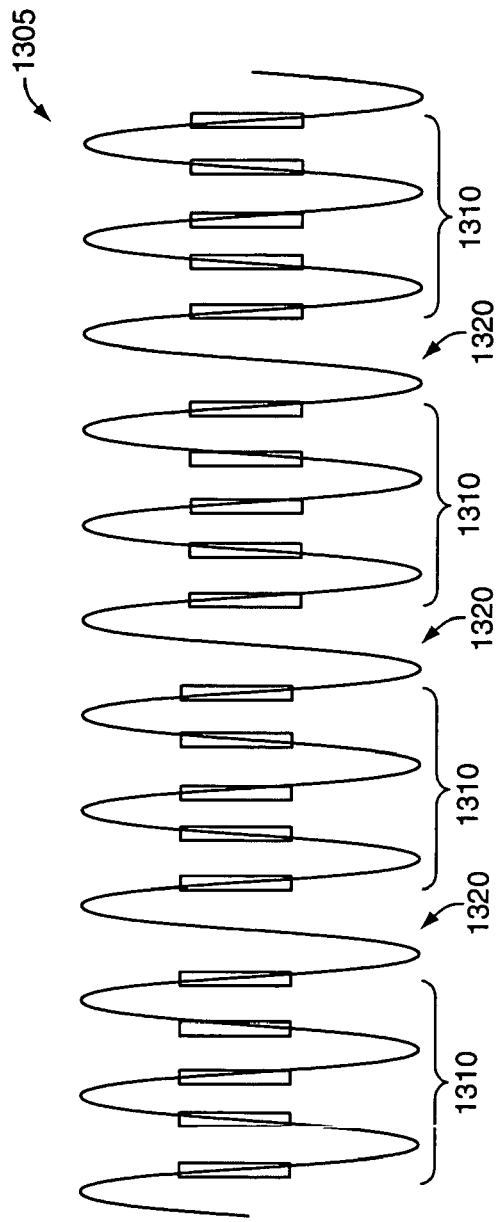
FIG. 17 shows how standard message packets are applied to the powerline.
Figure 18:
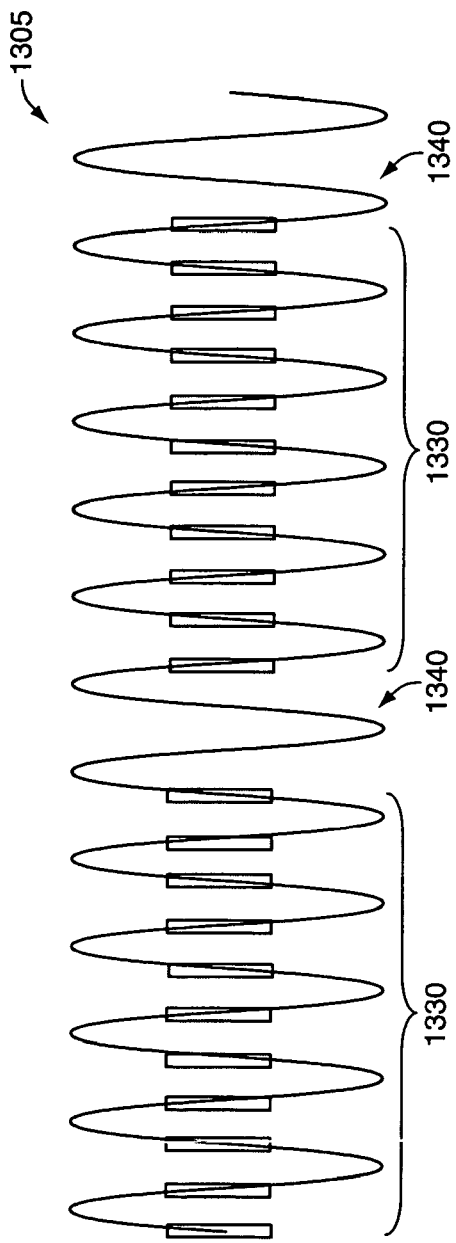
FIG. 18 shows how long message packets are applied to the powerline.

In practice, Insteon™ waits for one or two additional zero crossings after sending a message to allow time for potential retransmission of the message by Insteon™ RF devices. FIG. 17 shows a series of five-packet Standard Insteon™ messages 1310 being sent on the powerline signal 1305. Insteon™ waits for one zero crossing 1320 after each Standard packet before sending another packet. FIG. 18 shows a series of eleven-packet Extended Insteon™ messages 1330 being sent on the powerline signal 1305. Insteon™ waits for two zero crossings 1340 after efter Extended packet before sending another packet.

Insteon™ Standard messages contain 120 raw data bits and require six zero crossings, or 50 milliseconds to send. Extended messages contain 264 raw data bits and require thirteen zero crossings, or 108.33 milliseconds to send. Therefore, the actual raw bitrate for Insteon™ is 2400 bits per second for Standard messages, or 2437 bits per second for Extended messages, instead of the 2880 bits per second it would be without waiting for the extra zero crossings.

Insteon™ Standard messages contain 9 bytes (72 bits) of usable data, not counting packet sync and start code bytes, nor the message CRC byte. Extended messages contain 23 bytes (184 bits) of usable data using the same criteria. Therefore, the bitrates for usable data are further reduced to 1440 bits per second for Standard messages and 1698 bits per second for Extended messages. If one only counts the 14 bytes (112 bits) of User Data in Extended messages, the User Data bitrate is 1034 bits per second.

RF Insteon™ devices can send and receive the same messages that appear on the powerline. Unlike powerline messages, however, messages sent by RF are not broken up into smaller packets sent at powerline zero crossings, but instead are sent whole, as was shown in FIG. 5. As with powerline, there are two RF message lengths: Standard 10-byte messages and Extended 24-byte messages.

FIG. 19 gives the specifications for Insteon™ RF signaling. The center frequency lies in the band 902 to 924 MHz, which is permitted for unlicensed operation in the United States. Each bit is Manchester encoded, meaning that two symbols are sent for each bit. A one-symbol followed by a zero-symbol designates a one-bit, and a zero-symbol followed by a one-symbol designates a zero-bit. Symbols are modulated onto the carrier using frequency-shift keying (FSK), where a zero-symbol modulates the carrier half the FSK deviation frequency downward and a one-symbol modulates the carrier half the FSK deviation frequency upward. The FSK deviation frequency chosen for Insteon™ is 64 KHz. Symbols are modulated onto the carrier at 38,400 symbols per second, resulting in a raw data rata of half that, or 19,200 bits per second. The typical range for free-space reception is 150 feet, which is reduced in the presence of walls and other RF energy absorbers.

Insteon™ devices transmit data with the most-significant bit sent first. Referring to FIG. 5, RF messages begin with two sync bytes 411 or 421 comprising AAAA in hexadecimal, followed by a start code byte 412 or 422 of C3 in hexadecimal. Ten data bytes 413 follow in Standard messages, or twenty-four data bytes 423 in Extended messages. The last data byte in a message is a CRC over the data bytes as disclosed above.

It takes 5.417 milliseconds to send a 104-bit Standard message, and 11.250 milliseconds to send a 216-bit Extended message. Zero crossings on the powerline occur every 8.333 milliseconds, so a Standard RF message can be sent during one powerline half-cycle and an Extended RF message can be sent during two powerline half-cycles. The waiting times after sending powerline messages, as shown in FIG. 17 and FIG. 18, are to allow sufficient time for Insteon™ RF devices, if present, to retransmit a powerline message.

Insteon™ Message Retransmission

In order to improve reliability, the Insteon™ Messaging protocol includes message retransmission, a method for enabling other Insteon™ devices to help relay a message to increase its range. To avoid endless repetition data storms, message can be retransmitted a maximum of three times. The larger the number of retransmissions, however, the longer the message will take to complete.

There is a specific pattern of transmissions, retransmissions and acknowledgements that occurs when an Insteon™ Message is sent, as shown in FIG. 20. An Insteon™ Message on the powerline occupies either six or thirteen zero crossing periods, depending on whether the message is Standard or Extended. This message transmission time, six or thirteen powerline half-cycles, is called a timeslot in the following discussion.

During a single timeslot, such as 1420, and Insteon™ Message can be transmitted, retransmitted, or acknowledged. The entire process of communicating an Insteon™ Message, which may involve retransmissions and acknowledgements, will occur over integer multiples of timeslots.

Example 1, 1401, the simplest, shows a Broadcast message with no retransmissions. The T indicates that the Sender has originated and transmitted a single message. There is no acknowledgement that intended recipients have heard the message. The message requires one timeslot of six or thirteen powerline zero crossings to complete.

Example 2, 1402, shows a Broadcast message with a Max Hops of one. Max Hops can range from zero to three as explained above in conjunction with FIG. 9. The Sender transmits a Broadcast message as signified by the T. Another Insteon™ device, functioning as a repeater, listens to the message, as signified by an L, and then retransmits it in the next timeslot as indicated by the R.

Up to three retransmissions are possible with a message. Example 3, 1403, shows the progression of the message among an originating Sender and three repeating devices. Example 3 assumes that the range between repeaters is such that only adjacent repeaters can hear each other. Also, only Repeater 1 can hear the Sender. Note that the Sender will not retransmit its own message.

When a Sender transmits a Direct (or point-to-point) message, it expects an acknowledgement from the Recipient. Example 4, 1404, shows what happens if the Max Hops value is zero. The A designates the timeslot in which the Recipient acknowledges receipt of the Direct message. The C shows the timeslot when the Sender finds that the message is confirmed.

When Max Hops is set to one, a Direct message propagates as shown in Example 5, 1405. Repeater 1 will retransmit both the original Direct message and the acknowledgement from the Recipient.

If Max Hops is set to one, but no retransmission is needed because the Recipient is within range of the Sender, messages flow as shown in Example 6, 1406. The W in the Sender and Recipient rows indicates a wait. The Recipient immediately hears the Sender since it is within range. However, the Recipient must wait one timeslot before sending its acknowledgement, because it is possible that a repeating device will be retransmitting the Sender's message. Repeater 1 is shown doing just that in the example, although the Recipient would still have to wait even if no repeaters were present. Only when all of the possible retransmissions of the Sender's message are complete, can the Recipient send its acknowledgement. Being within range, the Sender hears the acknowledgement immediately, but it must also wait until possible retransmissions of the acknowledgement are finished before it can send another message.

Example 7, 1407, shows what happens when Max Hops is three and three retransmissions are in fact needed for the message to reach the Recipient. Note that if the Sender or Recipient were to hear the other's message earlier than shown, it still must wait until Max Hops timeslots have occurred after the message was originated before it is free to send its own message. If devices did not wait, they would jam each other by sending different messages in the same timeslot. A device can calculate how many timeslots have passed prior to receiving a message by subtracting the Hops Left number in the received message from the Max Hops number.

By monitoring Insteon™ message traffic, Insteon™ devices can determine when all of the possible retransmissions and acknowledgements for an Insteon™ message will be completed according to the above protocol. Similarly, Insteon™ devices can monitor X10 message traffic and thereby calculate when an X10 command will finish being sent. By waiting until preexisting message traffic is finished before transmitting, Insteon™ devices that wish to originate a message can avoid possible jamming of any Insteon™ or X10 communications already in progress. This form of listen-before-talk is called "politeness."

Politeness is further extended if an Insteon™ device wishes to send more than one message in a row. In that case, the device waits one additional powerline zero crossing period before initiating a follow-on message. The additional time gives other Insteon™ devices that may have been waiting for message traffic to complete an opportunity to transmit, and prevents a single device from monopolizing the channel with a long series of its own messages.

Insteon™ Simulcasting

By following the above rules for message propagation, Insteon™ systems achieve a marked increase in the reliability of communications. The reason is that multiple Insteon™ devices can transmit the same message at the same time within a given timeslot. Insteon™ devices within range of each other thus "help each other out." Most networking protocols for shared physical media prohibit multiple devices from simultaneously transmitting within the same band, as discussed above in the section on prior art. In contrast, Insteon™ turns what is usually a problem into a benefit by insuring that devices transmitting simultaneously will be sending the same messages in synchrony with each other.

One might think that multiple Insteon™ devices on the powerline could easily cancel each other out rather than boost each other. In practice, even if one were trying to accomplish it, signal cancellation by multiple devices would be extremely difficult to arrange. The reason is that for two signals to cancel at a given receiver, the two transmitters would have to send carriers such that the receiver would see them as exactly equal in amplitude and very nearly 180 degrees out of phase. The probability of this situation occurring and persisting for extended periods is low. The crystals used on typical Insteon™ devices to generate the powerline carrier frequency of 131.65 KHz run independently of each other with a frequency tolerance of a few tenths of a percent. Phase relationships among multiple powerline carriers therefore will drift, although slowly with respect to the 1823 microsecond duration of an Insteon™ packet. Even if the phases of two transmitters happened to cancel, it is very unlikely that the amplitudes would also be equal, so a receiver would very likely still see some signal even in the worst-case transient phase relationship. Insteon™ receivers have a wide dynamic range, from millivolts to five volts or so, which will allow them to track signals even if they fade temporarily. Adding more transmitters reduces the probability of signal cancellation even more. Rather, the probability that the sum of all the signals will increase in signal strength becomes much greater.

The Insteon™ powerline carrier is modulated using binary phase-shift keying (BPSK), meaning that receivers are looking for 180-degree phase shifts in the carrier to detect changes in a string of bits from a one to a zero or vice-versa. Multiple transmitters, regardless of the absolute phase of their carriers, will produce signals whose sum still possesses 180-degree phase reversals at bit-change boundaries, so long as their relative carrier frequencies to do not shift more than a few degrees over a packet time. Of course, bit timings for each transmitter need to be fairly well locked, so Insteon™ transmitters are synchronized to powerline zero crossings. An Insteon™ bit lasts for ten cycles of the 131.65 KHz powerline carrier, or 76 microseconds. The powerline zero crossing detector should be accurate within one or two carrier periods so that bits received from multiple transmitters will overlay each other.

In practice, multiple Insteon™ powerline transmitters simulcasting the same message will improve the strength of the powerline signal throughout a building. Since RF signaling is used as an extension to powerline signaling, it also is based on simulcasting. However, with RF, even when the carrier and data are ideally synchronized, interference patterns will form where the carrier signal is canceled. As with powerline, for a cancellation to occur, two carriers must be 180 degrees out of phase and the amplitudes must be the same. Perfect cancellation is practically impossible to obtain. In general, two co-located carriers on the same frequency with random phase relationships and the same antenna polarization will sum to a power level greater than that of just one transmitter only 67% of the time. As one of the transmitters is moved away from a receiver, the probability of cancellation drops further. As the number of transmitters increases, the probability of cancellation becomes nearly zero.

Mobile Insteon™ RF devices, such as handheld controllers, are battery operated. To conserve power, mobile devices are not configured as RF repeaters, but only as message originators, so simulcasting is not an issue. Insteon™ devices that do repeat RF messages are attached to the powerline, so most of them will not be moved around after initial setup. During setup, RF devices can be located, and their antennas adjusted, so that no signal cancellation occurs. With the location of the transmitters fixed, the non-canceling configuration will be maintained indefinitely.

Insteon™ RF devices attached to the powerline use the zero crossing for message synchronization. These devices receive Insteon™ messages synchronously on the powerline, synchronously via RF from RF repeaters, or possibly asynchronously via RF from mobile RF devices. Messages that need to be retransmitted will have a Hops Left count greater than zero. If the Insteon™ device receives such a message from the powerline, it will retransmit the message using RF as soon as it has received the last packet of the powerline message, then it will retransmit the message on the powerline in the next timeslot. If the device receives the message via RF, it will retransmit the message on the powerline in the next timeslot, then it will retransmit the message using RF immediately after sending the last packet of the powerline message.

Insteon™ Engine

Figure 21:
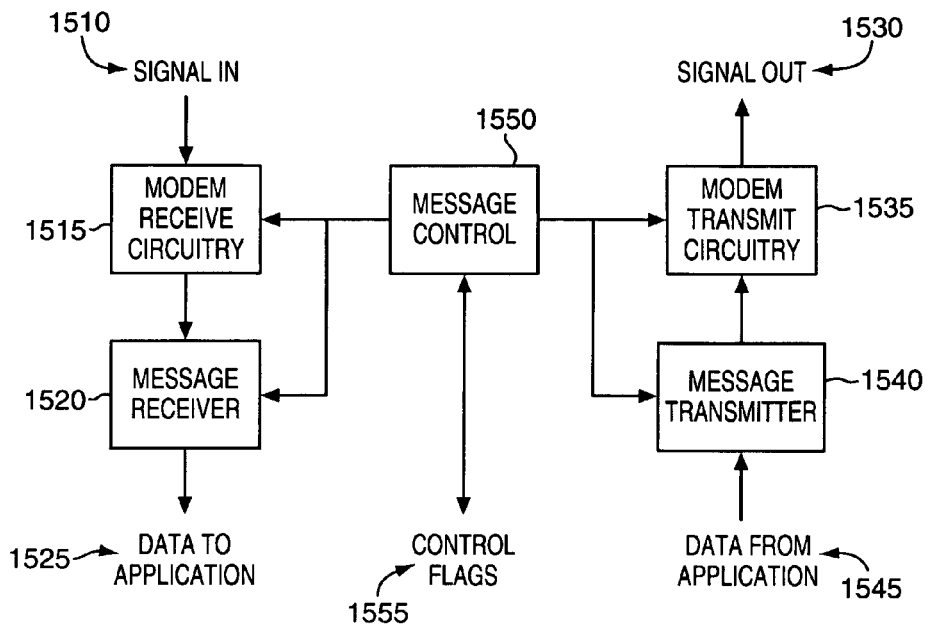
FIG. 21 is a block diagram showing how the Insteon™ Engine sends and receives messages.

The Insteon™ Engine comprises hardware and firmware that enable Insteon™ devices to send and receive Insteon™ messages. FIG. 21 shows the overall flow of information through the Insteon™ Engine. Received signals 1510 come from the powerline or via RF. Signal conditioning circuitry 1515 processes the raw signal and converts it into a digital bitstream. Message receiver firmware 1520 processes the bitstream as required and places the message payload data into a buffer 1525 which is available to the application running on the Insteon™ device. The message controller 1550 tells the application that data is available using control flags 1555.

To send an Insteon™ Message, the application places message data in a buffer 1545, then tells the message controller 1550 to send the message using control flags 1555. The message transmitter firmware 1540 processes the message into a raw bitstream, which it feeds to the transmitter section of the modem 1535. The modem transmitter sends the bitstream as a powerline or RF signal 1530.

Insteon™ Engine Powerline Interface

Figure 22:
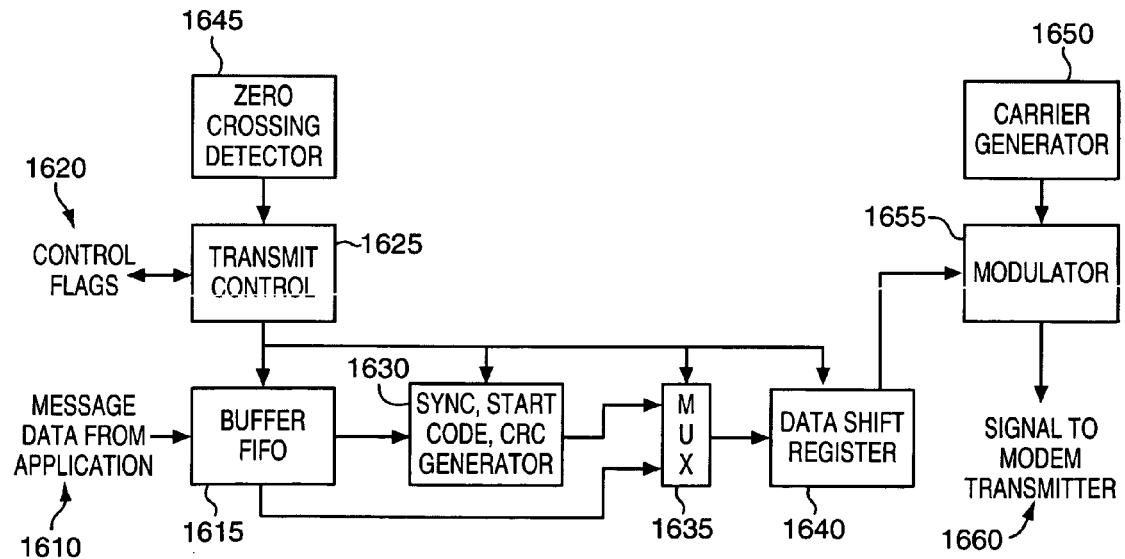
FIG. 22 is a block diagram showing how the Insteon™ Engine transmits a message on the powerline.

The message transmitter 1540 of FIG. 21 is given in greater detail in FIG. 22, which shows how the Insteon™ Engine sends an Insteon™ Message on the powerline. An Insteon™ application first composes a message 1610 that it wishes to send, excluding the CRC byte, and puts the message data in the transmit buffer 1615. The application then tells the transmit controller 1625 to send the message by setting appropriate control flags 1620. The transmit controller 1625 packetizes the message data by using multiplexer 1635 to put sync bits and a start code from generator 1630 at the beginning of a packet followed by data shifted out of the first-in first-out (FIFO) transmit buffer 1615. As the message data is shifted out of FIFO 1615, a CRC generator 1630 calculates the CRC byte, which is appended to the bitstream by multiplexer 1635 as the last byte in the last packet of the message. The bitstream is buffered in a shift register 1640 and clocked out in phase with the powerline zero crossings detected by zero crossing detector 1645. The BPSK modulator 1655 shifts the phase of the 131.65 KHz carrier from carrier generator 1650 by 180 degrees for zero-bits, and leaves the carrier unmodulated for one-bits. Note that the phase is shifted gradually over one carrier period as disclosed in conjunction with FIG. 15. Finally, the modulated carrier signal is applied to the powerline by the modem transmit circuitry 1535 of FIG. 21.

Figure 23:
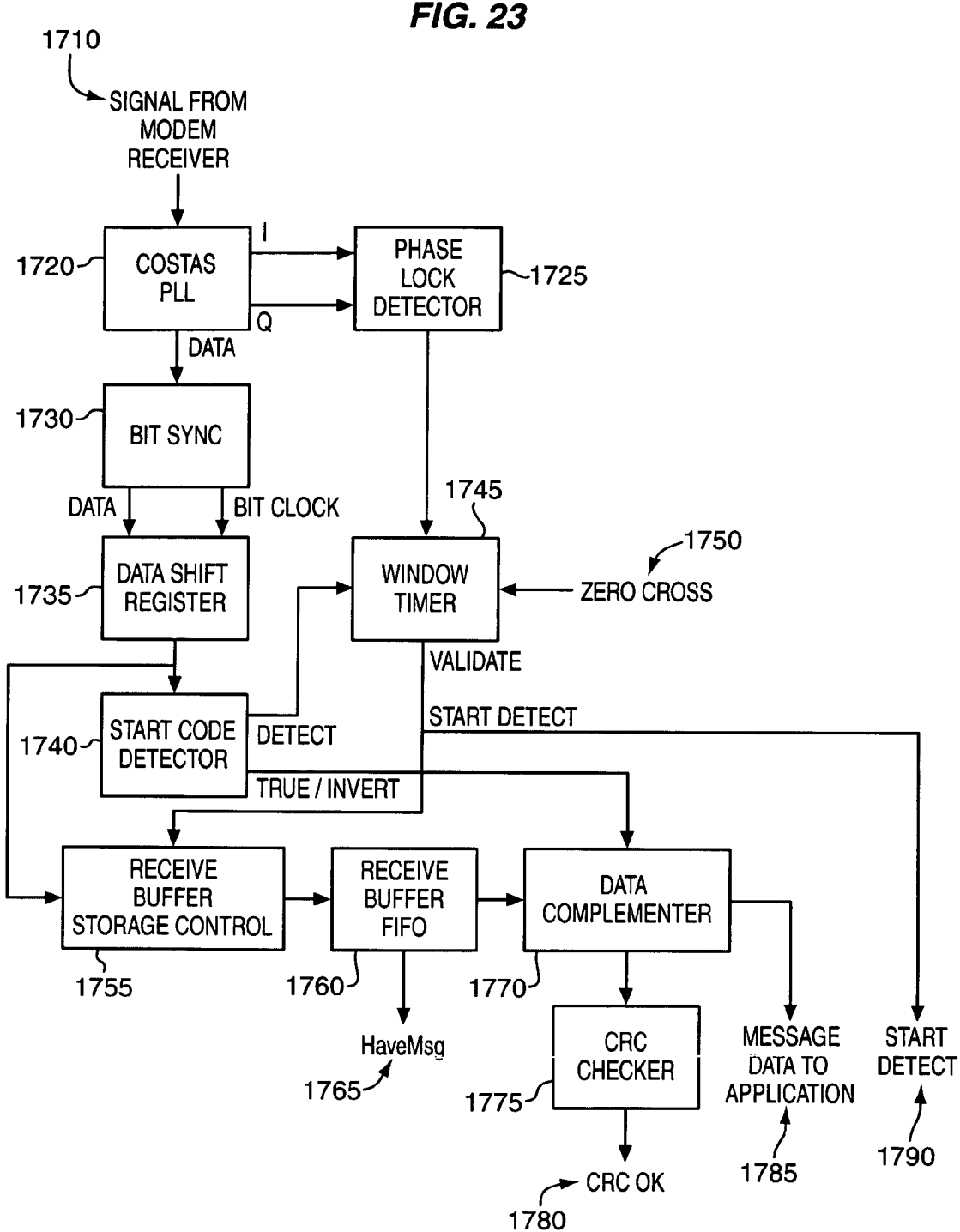
FIG. 23 is a block diagram showing how the Insteon™ Engine receives a message from the powerline.

The message receiver 1520 of FIG. 21 is given in greater detail in FIG. 23, which shows how the Insteon™ Engine receives Insteon™ messages from the powerline. The modem receive circuitry 1515 of FIG. 21 conditions the signal on the powerline and transforms it into a digital data stream that the firmware in FIG. 23 processes to retrieve Insteon™ messages. Raw data 1710 from the powerline is typically very noisy, because the received Insteon™ signal can have an amplitude as low as a only few millivolts, and the powerline often carries high-energy noise spikes or other noise of its own. Therefore, in a preferred embodiment, a Costas phase-locked loop (PLL) 1720, implemented in firmware, is used to find the BPSK Insteon™ signal within the noise. Costas PLLs, well known in the art, phase-lock to a signal both in phase and in quadrature. The phase-lock detector 1725 provides one input to the window timer 1745, which also receives a zero crossing signal 1750 and an indication that a start code in a packet has been found by start code detector 1740.

Whether it is phase-locked or not, the Costas PLL 1720 sends data to the bit sync detector 1730. When the sync bits of alternating ones and zeros at the beginning of a packet arrive, the bit sync detector 1730 will be able to recover a bit clock, which it uses to shift data into data shift register 1735. The start code detector 1740 looks for the start code following the sync bits and outputs a detect signal to the window timer 1745 after it has found one. The window timer 1745 determines that a valid Insteon™ packet is being received when the data stream begins 800 microseconds before the powerline zero crossing, the phase lock detector 1725 indicates lock, and detector 1740 has found a valid start code. At that point the window timer 1745 sets a start detect flag 1790 and enables the receive buffer controller 1755 to begin accumulating packet data from shift register 1735 into the FIFO receive buffer 1760. The storage controller 1755 insures that the FIFO 1760 only builds up the data bytes in a message, and not sync bits or start codes. It stores the correct number of bytes, 10 for a Standard message and 24 for an Extended message, by inspecting the Extended Message bit in the Message Flags byte. When the correct number of bytes has been accumulated, a HaveMsg flag 1765 is set to indicate a message has been received.

Costas PLLs have a phase ambiguity of 180 degrees, since they can lock to a signal equally well in phase or antiphase. Therefore, the detected data from PLL 1720 may be inverted from its true sense. The start code detector 1740 resolves the ambiguity by looking for the true start code, C3 hexadecimal, and also its complement, 3C hexadecimal. If it finds the complement, the PLL is locked in antiphase and the data bits are inverted. A signal from the start code detector 1740 tells the data complementer 1770 whether to un-invert the data or not. The CRC checker 1775 computes a CRC on the received data and compares it to the CRC in the received message. If they match, the CRC OK flag 1780 is set.

Data from the complementer 1770 flows into an application buffer, not shown, via path 1785. The application will have received a valid message when the HaveMsg flag 1765 and the CRC OK flag 1780 are both set.

Insteon™ Engine RF Interface

Figure 24:
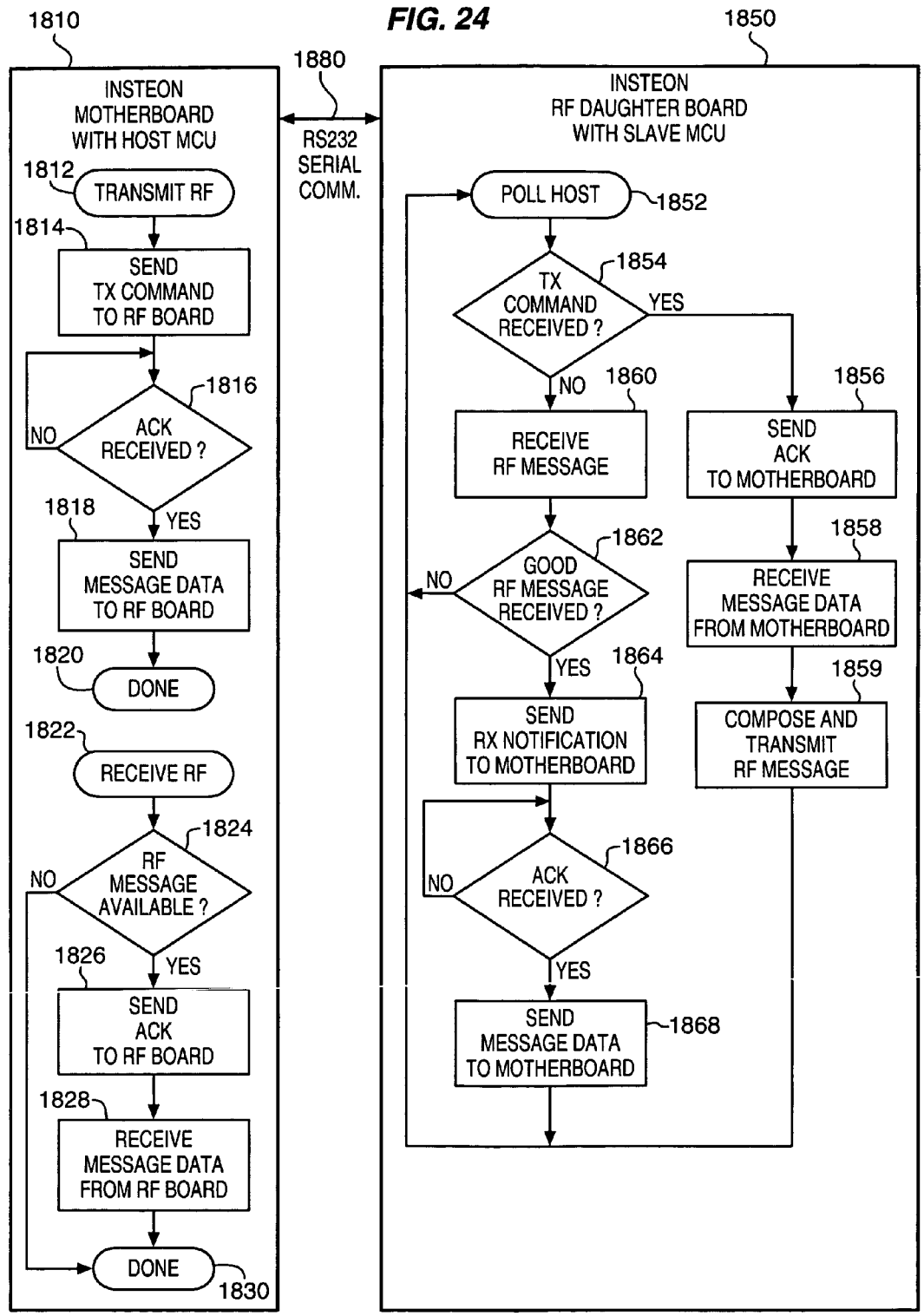
FIG. 24 is a flowchart showing how an Insteon™ RF daughter board communicates with an Insteon™ motherboard.

FIG. 24 shows how the Insteon™ Engine sends and receives messages via RF. In a preferred embodiment, an Insteon™ device for the powerline can be fitted with a daughter board that extends the device's capabilities. The daughter board 1850 shown in FIG. 24 provides an RF interface to the host 1810. It has an onboard RF transceiver and its own microcontroller unit (MCU), which acts as a slave to the host MCU. The host and the slave MCUs communicate using the well-known RS232 serial protocol 1880 at TTL logic levels.

When the Insteon™ Engine running on the host MCU needs to transmit an RF message, it executes the procedure beginning at step 1812. First, it sends a transmit command to the slave MCU on the RF daughter board at step 1814, then it waits for an acknowledgement that the command has been received and the slave MCU is ready to transmit at step 1816. When the slave MCU is ready, the host sends the data in the Insteon™ Message to it in step 1818. Since the slave MCU handles all the details of sending an RF message, the host can resume other operations at step 1820.

To check if any RF messages have been received, the host executes the procedure beginning at step 1822. The host checks its RS232 receive buffer at step 1824 to see if the slave has notified it that an RF message is available. If not, the host continues with other processing at step 1830, but if there is an RF message the host sends an acknowledgement to the slave at step 1826. The slave sends the data in the message to the host in step 1828 and the host continues processing in step 1830.

The slave MCU on the RF daughter board 1850 handles its tasks as shown in the flowchart on the right side of FIG. 24. The slave MCU periodically checks its RS232 receive buffer at step 1852 for commands from the host. At step 1854, if the slave finds that it has received a command from the host to transmit an RF message, it acknowledges the command at step 1856, receives the message data from the host at step 1858, and then composes the RF message and transmits it at step 1859.

If at step 1854 the slave MCU finds it has not received a transmit command from the host, it attempts to receive RF data from the onboard RF transceiver at step 1860. If the slave has not received a valid RF message at step 1862 it reenters its polling loop at step 1852 and tries again. If, however, the slave MCU has received a valid RF message, it notifies the host at step 1864 and waits for an acknowledgement that the host is ready to receive the data at step 1866. When the host sends an acknowledgement, the slave sends the data in the message to the host in step 1868, then resumes its polling loop at step 1852.

Figure 25:
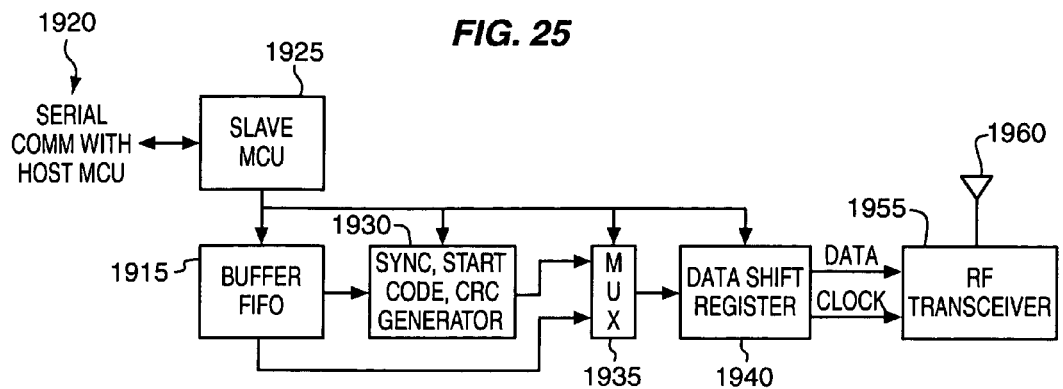
FIG. 25 is a flowchart showing how the Insteon™ RF daughter board transmits a message via RF.

FIG. 25 shows in greater detail how the slave MCU 1925 composes and transmits an RF message at step 1859 of FIG. 24. The steps are similar to those for sending powerline messages given in FIG. 22, except that RF messages are sent all at once in a single packet. In FIG. 25, the host MCU composes a message that it wishes to send, excluding the CRC byte, and sends the message data to the slave MCU 1925 via RS232 serial communications 1920. The slave puts the message data into transmit buffer 1915. The slave MCU 1925 uses multiplexer 1935 to put sync bits and a start code from generator 1930 at the beginning of the RF message followed by data shifted out of the first-in first-out (FIFO) transmit buffer 1915. As the message data is shifted out of FIFO 1915, a CRC generator 1930 calculates the CRC byte, which is appended to the bitstream by multiplexer 1935 as the last byte of the message. The bitstream is buffered in a shift register 1940 and clocked out to the RF transceiver 1955. The transceiver generates an RF carrier, translates the bits in the message into Manchester-encoded symbols, FM modulates the carrier with the symbol stream, and transmits the resulting RF signal using antenna 1960. In a preferred embodiment, the RF transceiver 1955 is a single-chip hardware device and the other blocks in the figure are implemented in firmware running on the slave MCU 1925.

Figure 26:
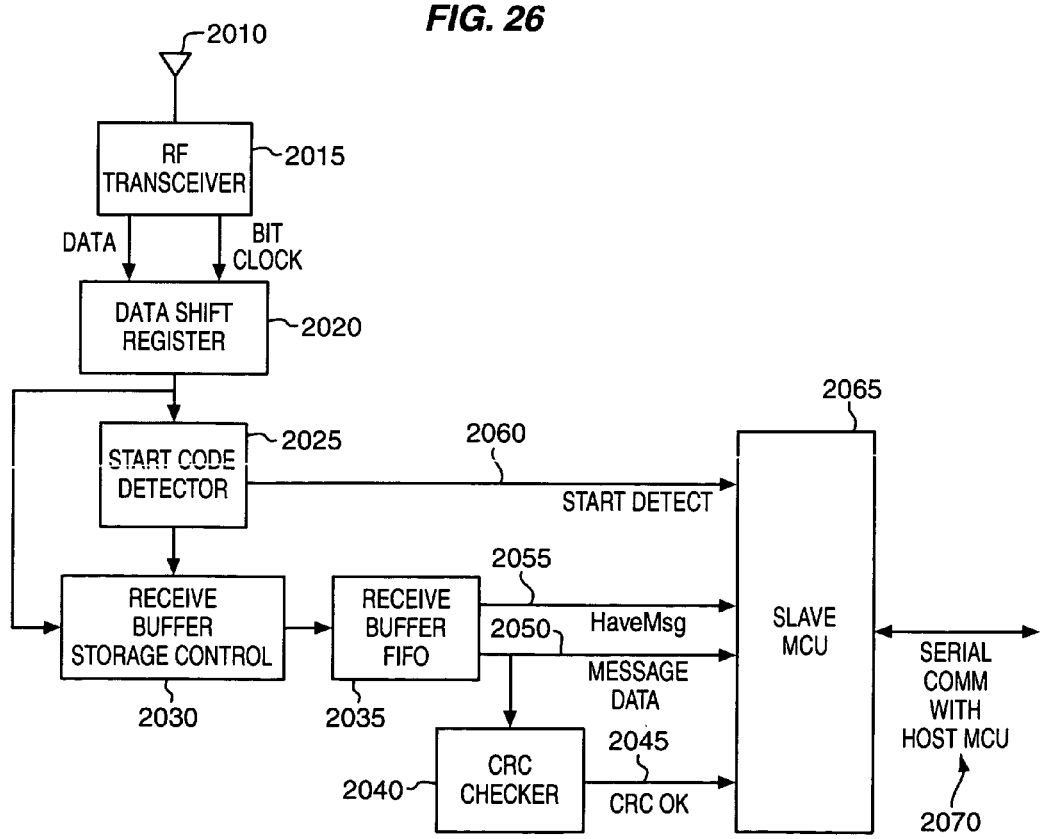
FIG. 26 is a flowchart showing how the Insteon™ RF daughter board receives a message via RF.

FIG. 26 shows in greater detail how the slave MCU receives an RF message at step 1860 of FIG. 24. The steps are similar to those for receiving powerline messages given in FIG. 23, except that RF messages are sent all at once in a single packet. In FIG. 26 the RF transceiver 2015 receives an RF transmission from antenna 2010 and FM demodulates it to recover the baseband Manchester symbols. The sync bits at the beginning of the message allow the transceiver to recover a bit clock, which it uses to recover the data bits from the Manchester symbols. The transceiver outputs the bit clock and the recovered data bits to shift register 2020, which accumulates the bitstream in the message.

The start code detector 2025 looks for the start code following the sync bits at the beginning of the message and outputs a detect signal 2060 to the slave MCU 2065 after it has found one. The start detect flag 2060 enables the receive buffer controller 2030 to begin accumulating message data from shift register 2020 into the FIFO receive buffer 2035. The storage controller 2030 insures that the FIFO 2035 only stores the data bytes in a message, and not the sync bits or start code. It stores the correct number of bytes, 10 for a Standard message and 24 for an Extended message, by inspecting the Extended Message bit in the Message Flags byte. When the correct number of bytes has been accumulated, a HaveMsg flag 2055 is set to indicate a message has been received. The CRC checker 2040 computes a CRC on the received data and compares it to the CRC in the received message. If they match, the CRC OK flag 2045 is set. When the HaveMsg flag 2055 and the CRC OK flag 2045 are both set, the message data is ready to be sent to the host via RS232 communications 2070. In a preferred embodiment, the RF transceiver 2015 is a single-chip hardware device and the other blocks in the figure are implemented in firmware running on the slave MCU 2065.

Insteon™ Hardware

Figure 27:
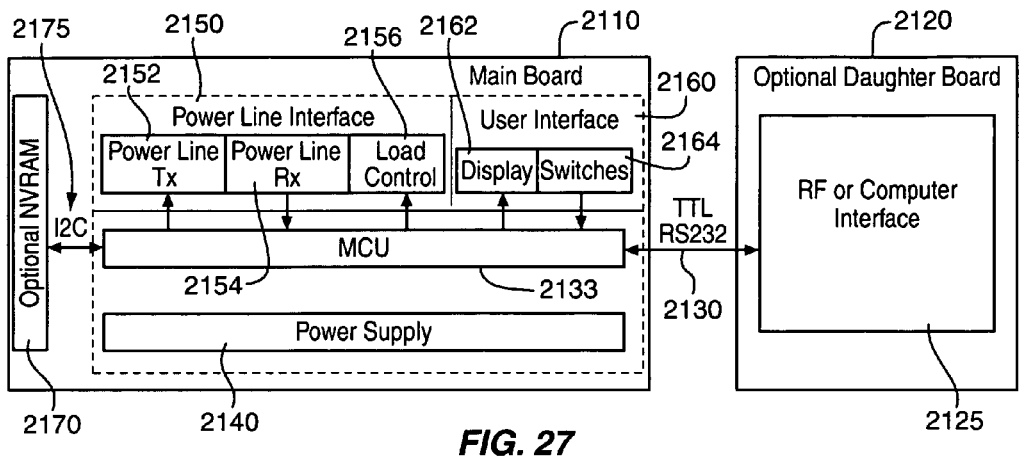
FIG. 27 is a block diagram of an Insteon™ main board with optional daughter board.

FIG. 27 is a block diagram of the hardware circuitry comprising a typical Insteon™ device. In a preferred embodiment, Insteon™ devices comprise a main circuit board 2110 with an optional daughter board 2120. Typical daughter boards 2120 provide Insteon™ devices with additional capabilities by adding communications interfaces of various types. Main boards and daughter boards communicate using a serial RS232 protocol 2130 at TTL logic levels.

An Insteon™ main board connects to the powerline by means of the device in which it is installed, either by being plugged in or hardwired. The power supply 2140 derives energy from the powerline and conditions it suitably to power the logic and communications hardware on the main and optional daughter boards. The microcontroller unit (MCU) 2133 executes all the firmware programming preloaded into the device at the time of manufacture, and all software programs which may be downloaded to it during usage. An optional non-volatile random-access memory (NVRAM) 2170 provides storage for local database information, operational parameters, and downloaded application programming. Such memory chips 2170 typically communicate with the MCU 2133 via a serial link 2175, shown in the figure as an Inter-Integrated Circuit (I2C) link.

The powerline interface 2150 comprises a powerline transmitter 2152 and receiver 2154, which are capable of sending and receiving both Insteon™ and X10 signals over the powerline. The load control 2156, if present, typically comprises a triac or a relay. A triac can provide variable power to resistive loads, such as lamps, in order to dim them. Inductive or high-power loads can be switched on or off using a mechanical relay. Some load control modules are also capable of sensing whether a controlled load has been turned on or off manually. For example, if a lamp is plugged into an Insteon™ lamp controller and a person turns on the lamp using the switch on the lamp, the load control module can sense the current draw and turn on the triac so the lamp will illuminate. Conversely, if the triac turns on but the lamp's switch is off, the load control module can sense the problem so that the Insteon™ device can display or send an appropriate error message.

The user interface module 2160 can vary depending on the type of device the main board 2110 is built into. In simple cases, such as a SwitchLinc™ device, which looks like a wall switch and is wired into an electrical junction box, two momentary-contact switches under a plastic control paddle detect user input. One switch makes contact when the user pushes the top of the paddle, and the other makes contact when the user pushes the bottom of the paddle. Such a device will typically have one or more light-emitting diodes (LEDs) to indicate the status of the load under control, or to guide the user through a setup procedure. Many Insteon™ devices use white LEDs for this purpose, with optional colored filters to allow users to customize the color displayed by the LEDs. User-control over the brightness of the LEDs is another feature often incorporated into Insteon™ devices, typically accomplished by duty-cycle modulating an LED's power.

More elaborate Insteon™ devices can incorporate a display, such as a monochrome or color LCD as used in cellphones, PDAs or PCs. There may be multiple pushbuttons configured as a keypad or keyboard, or there may be other types of sensing devices such as proximity detectors. One skilled in the art can envision a broad array of devices into which Insteon™ technology can be embedded, and the preferred embodiment disclosed here is only one configuration of many possible alternative configurations.

Figure 28:
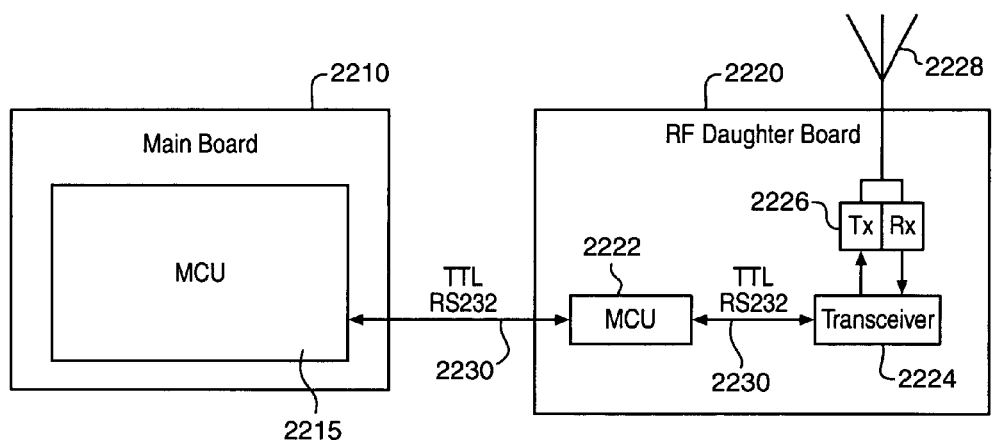
FIG. 28 is a block diagram of an Insteon™ main board with an RF daughter board.

FIG. 28 shows an Insteon™ main board 2210 with an MCU 2215 connected via RS232 2230 to an RF daughter board 2220. This configuration was described in detail above. The RF daughter board comprises its own MCU 2222 in communication with an RF transceiver chip 2224. The RF transceiver comprises circuitry 2226 to both send and receive RF signals using antenna 2228.

Figure 29:
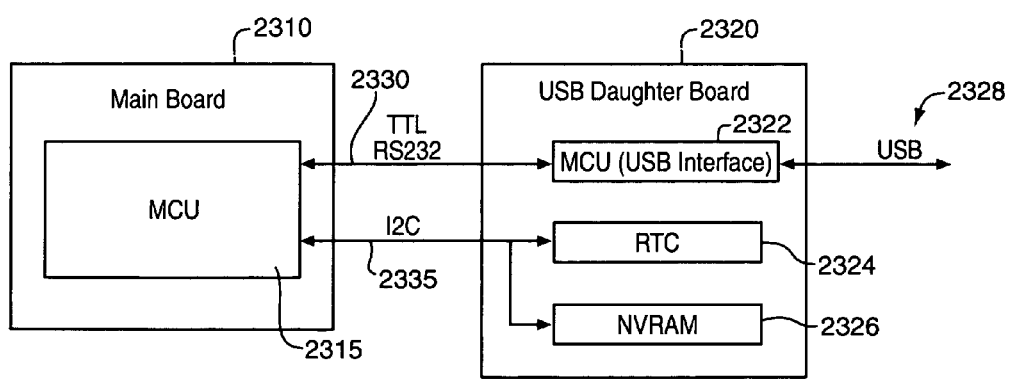
FIG. 29 is a block diagram of an Insteon™ main board with a USB daughter board.

FIG. 29 shows an Insteon™ main board 2310 with an MCU 2315 connected to a Universal Serial Bus (USB) daughter board 2320. As shown, the USB board comprises its own slave MCU 2322 with an on-chip USB interface, a realtime clock (RTC) 2324, and additional non-volatile random-access memory (NVRAM) 2326. The slave MCU 2322 communicates with the host MCU 2315 using serial RS232 2330. The RTC and the NVRAM are connected to the host MCU via an I2C bus 2335. The USB interface 2328 enables Insteon™ devices to interface with any other equipment that has a USB port.

Figure 30:
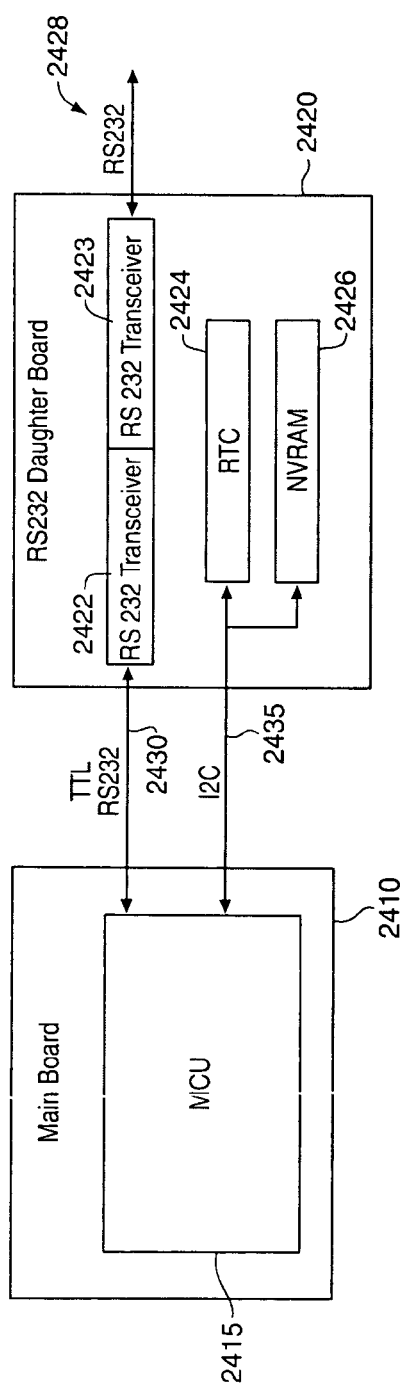
FIG. 30 is a block diagram of an Insteon™ main board with an RS232 daughter board.

FIG. 30 shows an Insteon™ main board 2410 with an MCU 2415 connected to an RS232 daughter board 2420. As shown, the RS232 board comprises an RS232 Transceiver 2422 with a level converter 2423, a realtime clock (RTC) 2424, and additional non-volatile random-access memory (NVRAM) 2426. The RTC and the NVRAM are connected to the host MCU via an I2C bus 2435. The host MCU 2415 connects via the RS232 serial link 2430 to the RS232 interface 2428, thus enabling Insteon™ devices to interface with any other equipment that has an RS232 port.

Figure 31:
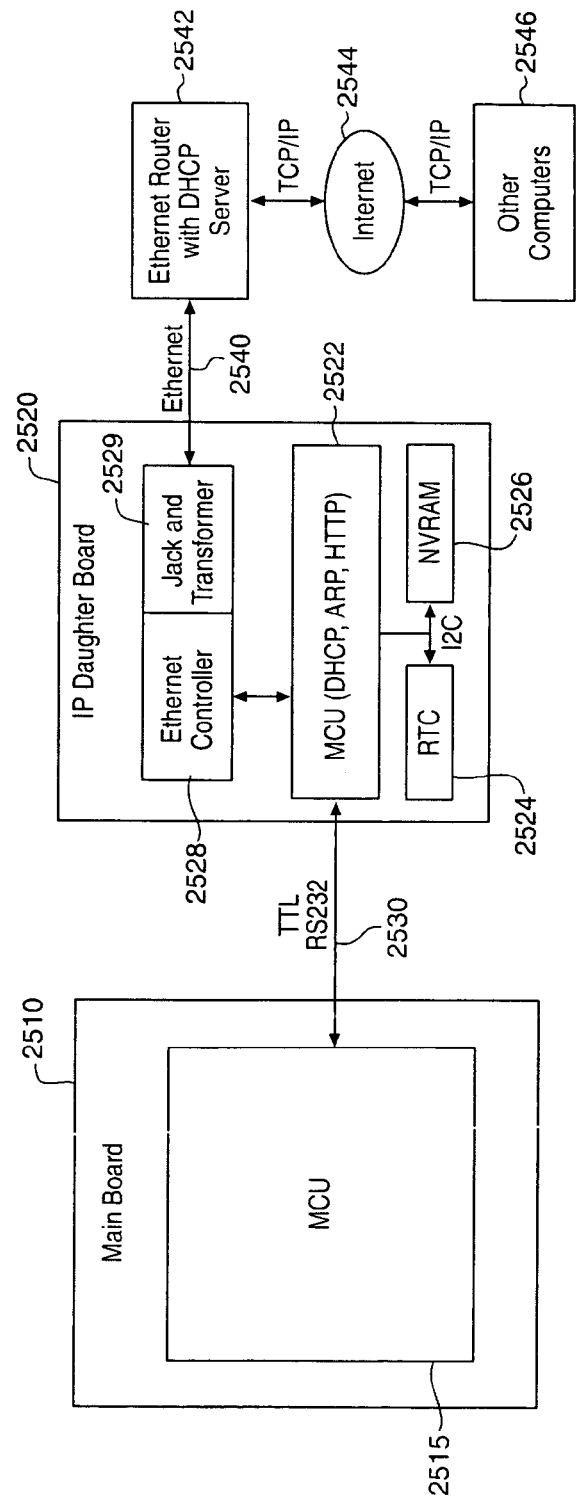
FIG. 31 is a block diagram of an Insteon™ main board with an Ethernet daughter board.

FIG. 31 shows an Insteon™ main board 2510 with an MCU 2515 connected to an Internet protocol (IP) daughter board 2520, which allows Insteon™ devices to communicate with a local-area network (LAN) or the Internet. The IP board 2520 has its own slave MCU 2522 running a Dynamic Host Configuration Protocol (DHCP) client, an Address Resolution Protocol (ARP) client, and a Hypertext Transport Protocol (HTTP) stack. The MCU 2522 attaches to an Ethernet LAN 2540 via Ethernet controller 2528 and physical interface 2529. The LAN can connect to the Internet 2544 via a router 2542. Once on the Internet, the Insteon™ device can interface with computers 2546 anywhere in the world.

Insteon™ Applications and Devices

Insteon™ technology can be built into many different kinds of equipment, and it can interface with all kinds of non-Insteon™ equipment via communications bridges. Applications for Insteon™-enabled equipment are diverse.

A partial list of applications includes (1) home management incorporating sensors, heating ventilating and air-conditioning (HVAC), appliances, lighting, and security; (2) audio/video (AN) remote control, with tie-ins to home management; (3) energy management; (4) remote monitoring via the Internet; and (5) interoperation with voice recognition and response, cameras and other sensing modalities.

Products that can be improved using Insteon™ technology include (1) electrical devices such as plug-in or wire-in dimmers, switches, or outlets, (2) home appliances; (3) annunciators, thermostats, access controllers; (4) pool/spa and irrigation controllers; (5) environmental, device status, motion, room occupancy, or contact sensors; and (6) PC, touchscreen, keypad, handheld, or keyfob controllers.

Using bridges to other networking standards, Insteon™ devices can interoperate with other devices communicating using WiFi (IEEE 802.11), BlueTooth, ZigBee, ZWave, HomePlug, HomeRF, Intellon, Echelon, CEBus, or other future technology.

A network of Insteon™ devices with at least one device having USB, RS232, or Ethernet communications capabilities can connect to a PC or access points to the Internet. New software can be downloaded to Insteon™ devices, making them capable of being upgraded with new capabilities in the future. This same connectivity also allows local networks of Insteon™ devices to interact with remote processes. An infrastructure of low-cost, reliable devices capable of being upgraded and interfaced remotely can be used in so many different ways that it is not possible to foresee them all.

Figure 32:
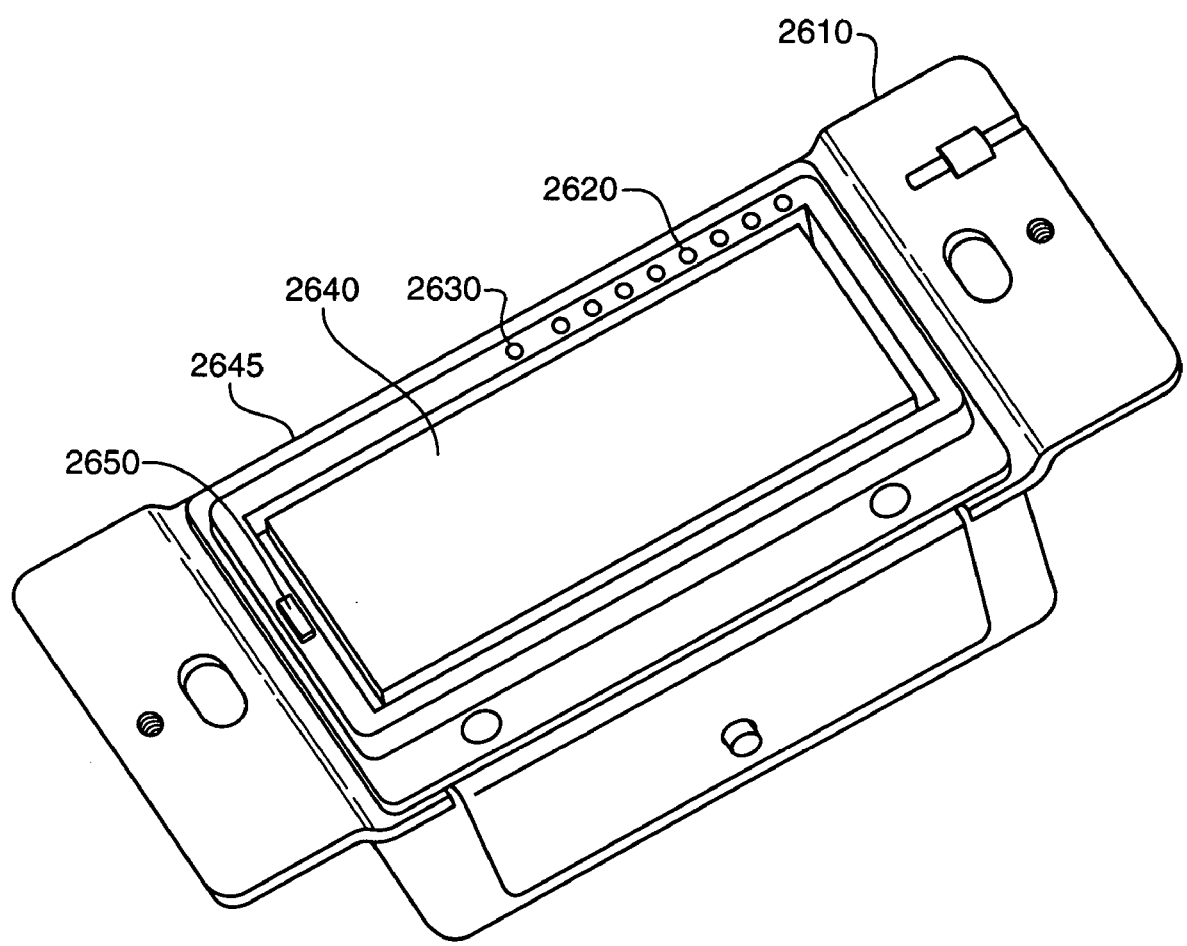
FIG. 32 shows a wire-in Insteon™ wall switch.

An initial set of devices incorporating Insteon™ technology is given here. FIG. 32 shows a wire-in wall switch 2610. The user can depress the top or the bottom of the paddle 2640 to depress a top or a bottom momentary pushbutton switch underneath. The paddle 2640 and escutcheon plate 2645 snap out so that they can be easily replaced by ones of different colors. Plastic light guides 2620 and 2630 are illuminated by white LEDs underneath. The light guides can be replaced by ones of different colors so that the color seen by the user can be changed. Item 2650 is a combined LED light guide, momentary pushbutton switch, and pullout airgap switch. Holding it down puts the device into a setup mode, or pulling it out disables the device by disconnecting it from the powerline.

Figure 33:
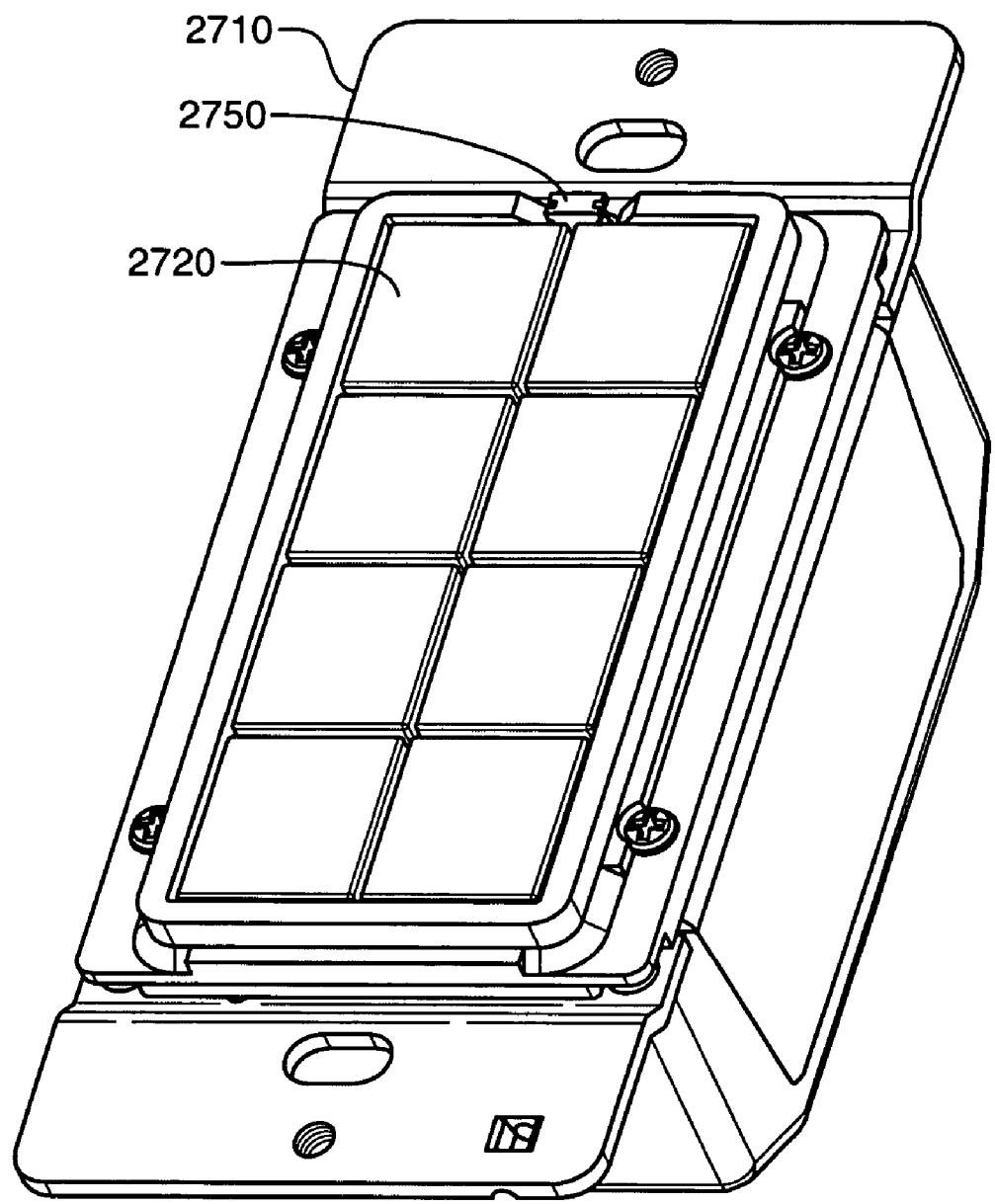
FIG. 33 shows a wire-in Insteon™ keypad controller.

FIG. 33 shows an Insteon™ device 2710 that wires into a junction box in place of a wall switch. It has eight pushbuttons 2720, which are illuminated from behind by white LEDs that can be filtered to be any color. Transparent legends, printable by a laser printer, can be placed behind the buttons to label them. The item 2750 serves the same purpose as item 2650 in FIG. 32.

Figure 34:
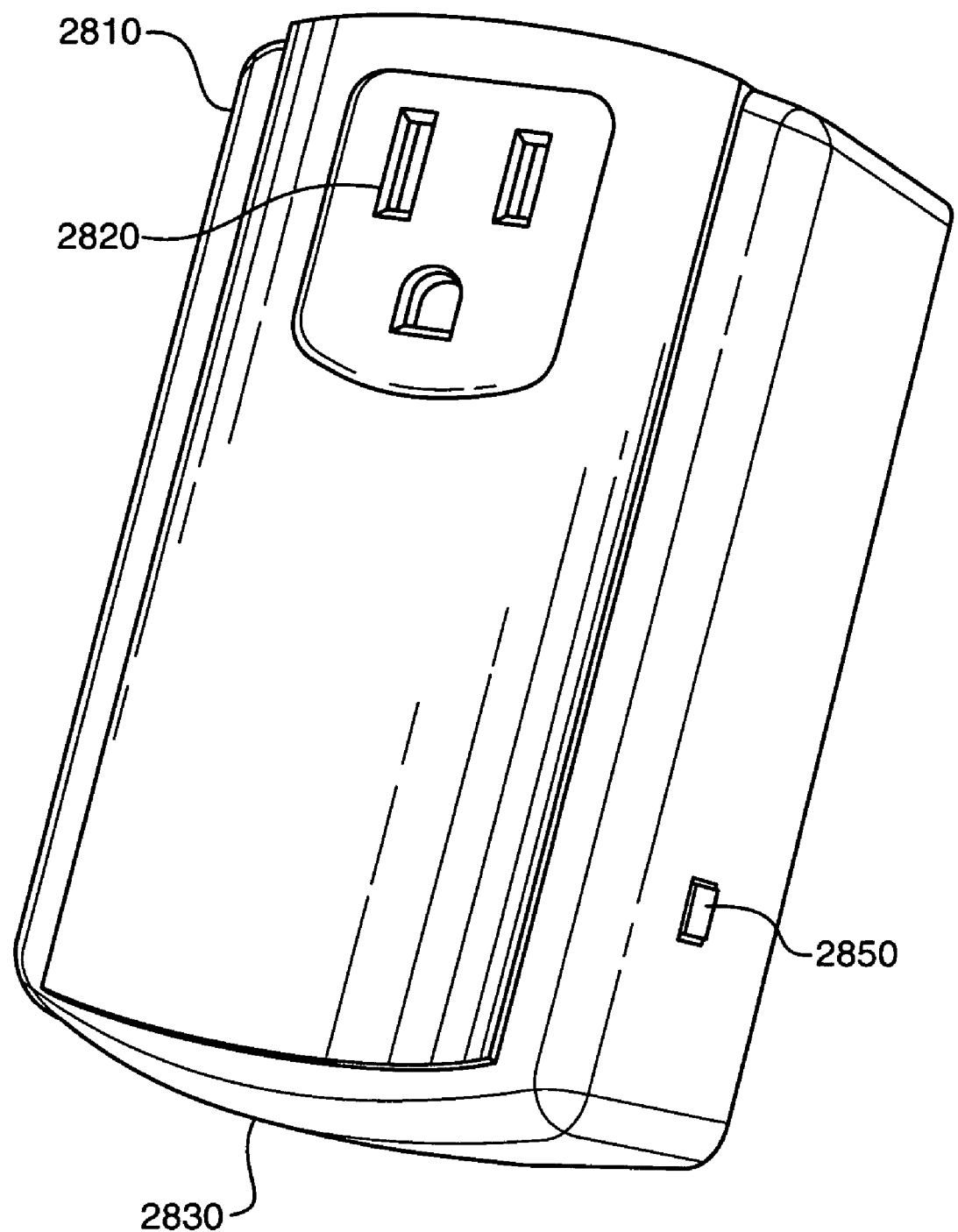
FIG. 34 shows a plug-in Insteon™ lamp dimmer, appliance controller or communications interface device.

FIG. 34 shows a plugin Insteon™ device 2810 that can be configured as a dimmer or a relay switch. The appliance being controlled plugs into outlet 2820. An optional connector 2830 can be configured to provide a USB, RS232, or Ethernet connection for appropriate internal Insteon™ daughter boards. The item 2850 serves the same purpose as item 2650 in FIG. 32.

Figure 35:
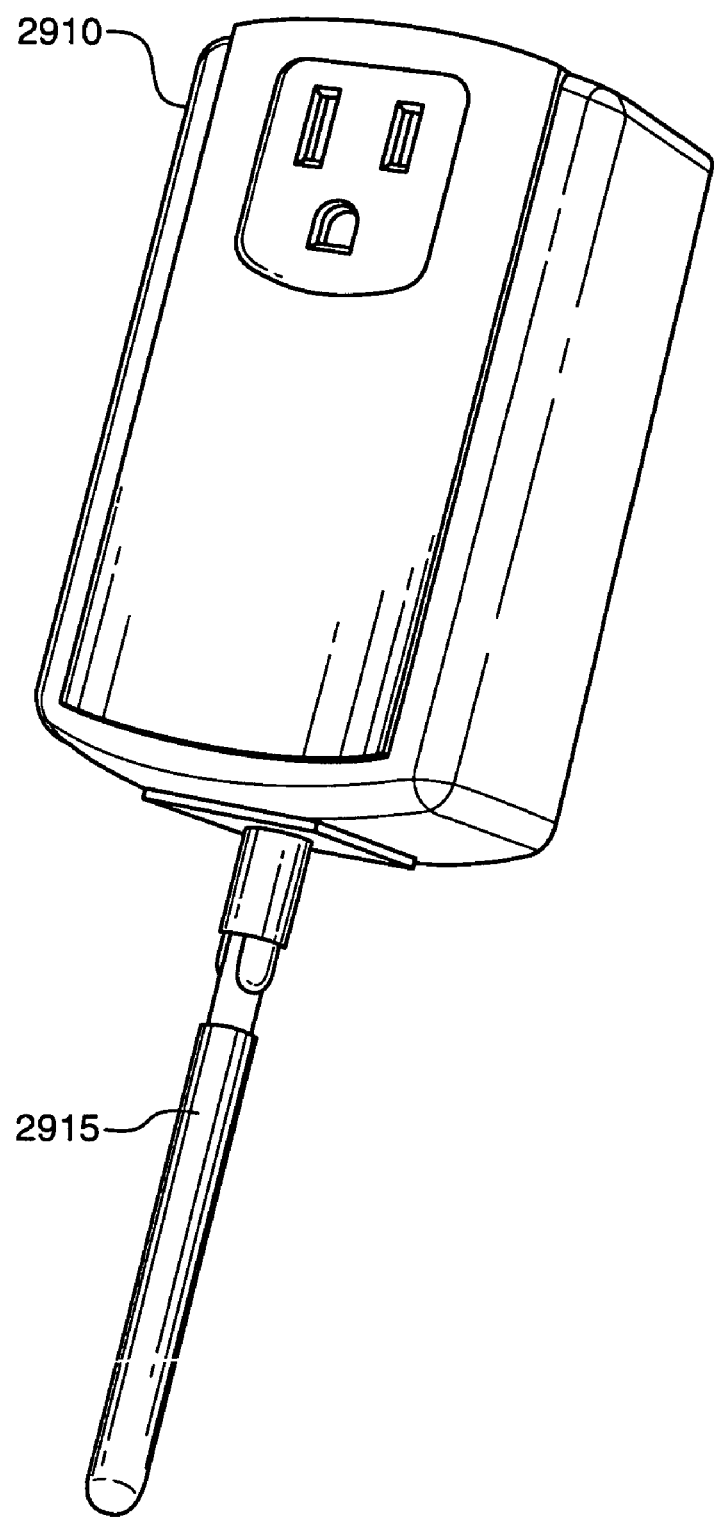
FIG. 35 shows a plug-in Insteon™ lamp dimmer with RF communications.

FIG. 35 shows a plugin Insteon™ device 2910 like that of FIG. 34, except that it supports an internal RF daughter board. RF antenna 2915 is connected to the RF transceiver on the RF daughter board. Users can twist or bend the articulated antenna to achieve best performance.

Figure 36:
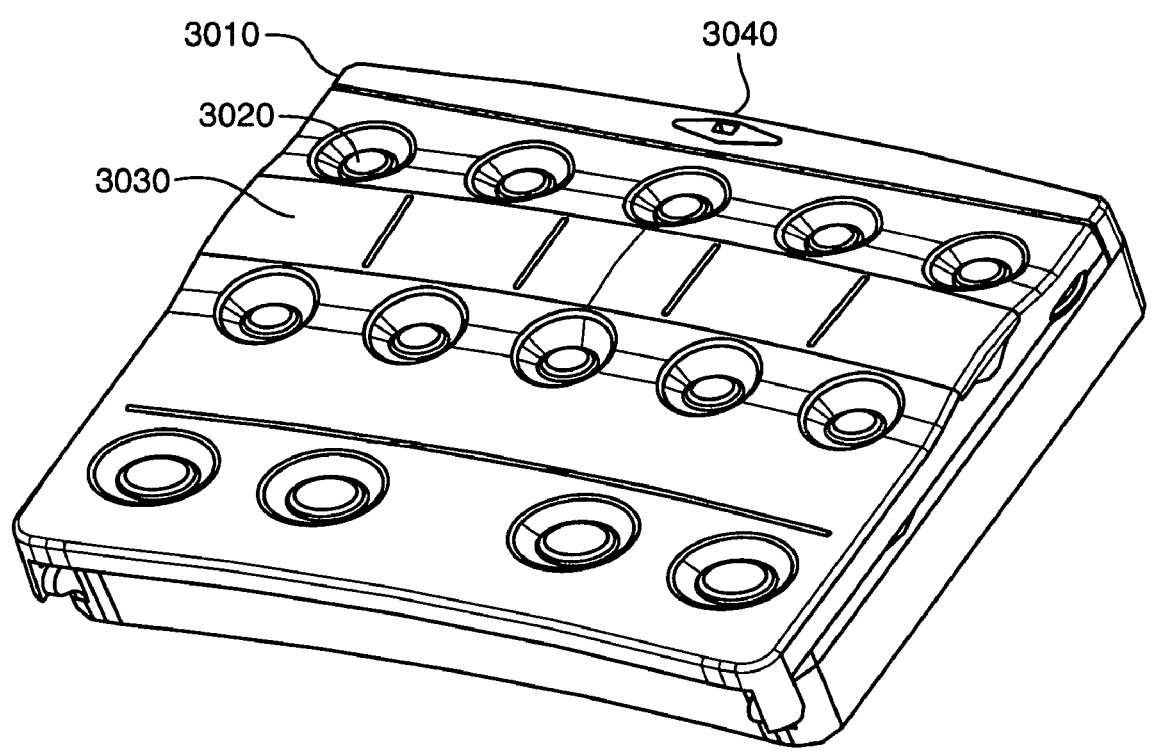
FIG. 36 shows a tabletop or wallmount Insteon™ pushbutton controller.

FIG. 36 shows a pushbutton controller 3010 with pushbuttons 3020. Laser-printable legends can be placed behind transparent strip 3030 to label the button functions. LED 3040 provides user feedback.

Figure 37:
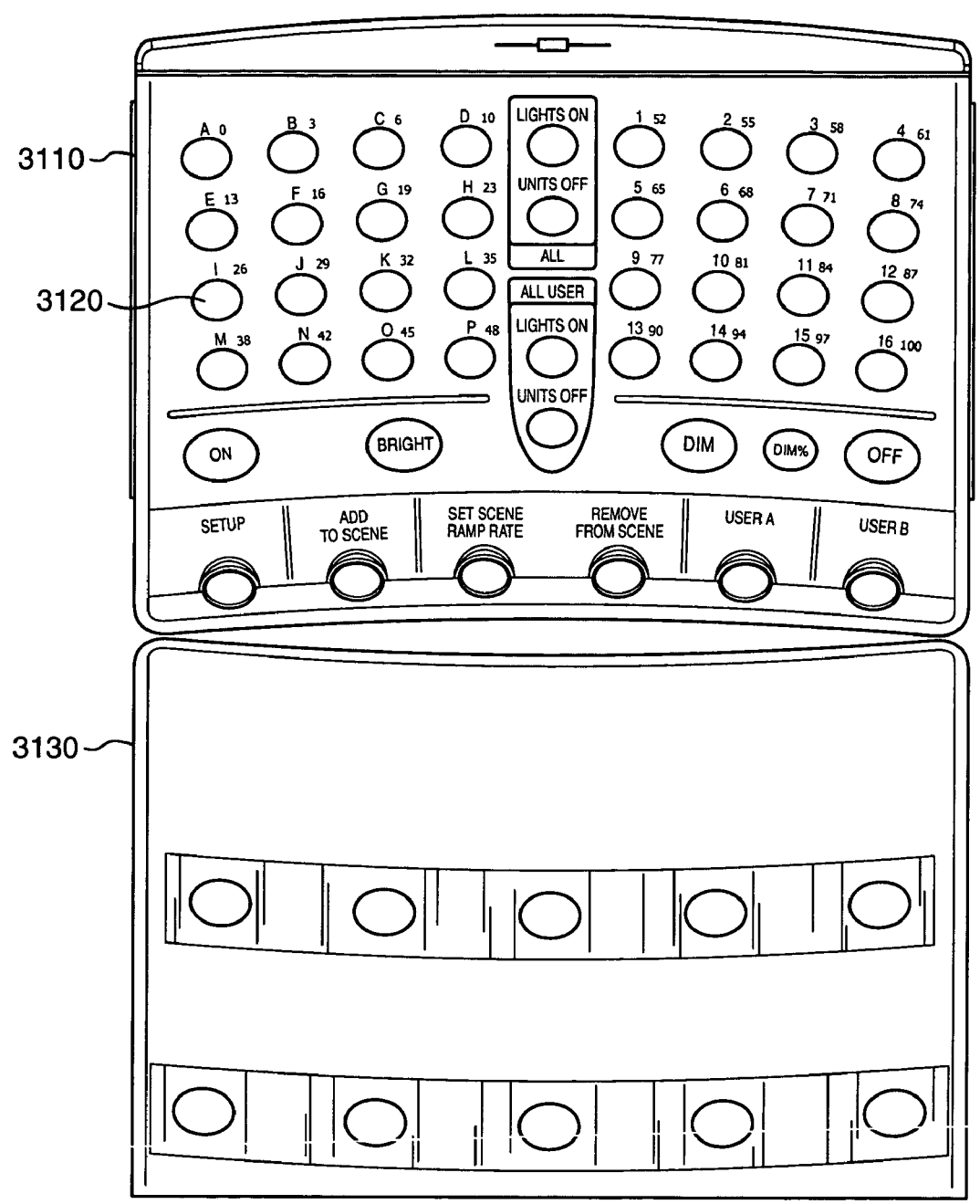
FIG. 37 shows an Insteon™ pushbutton controller with its hinged button cover opened.

FIG. 37 shows another version of a pushbutton controller 3110 with substantially more buttons 3120. Cover 3130, when closed, covers all but eight of the buttons, providing a simpler, less cluttered interface to the user, similar to that of FIG. 36.

Figures 38, 39:
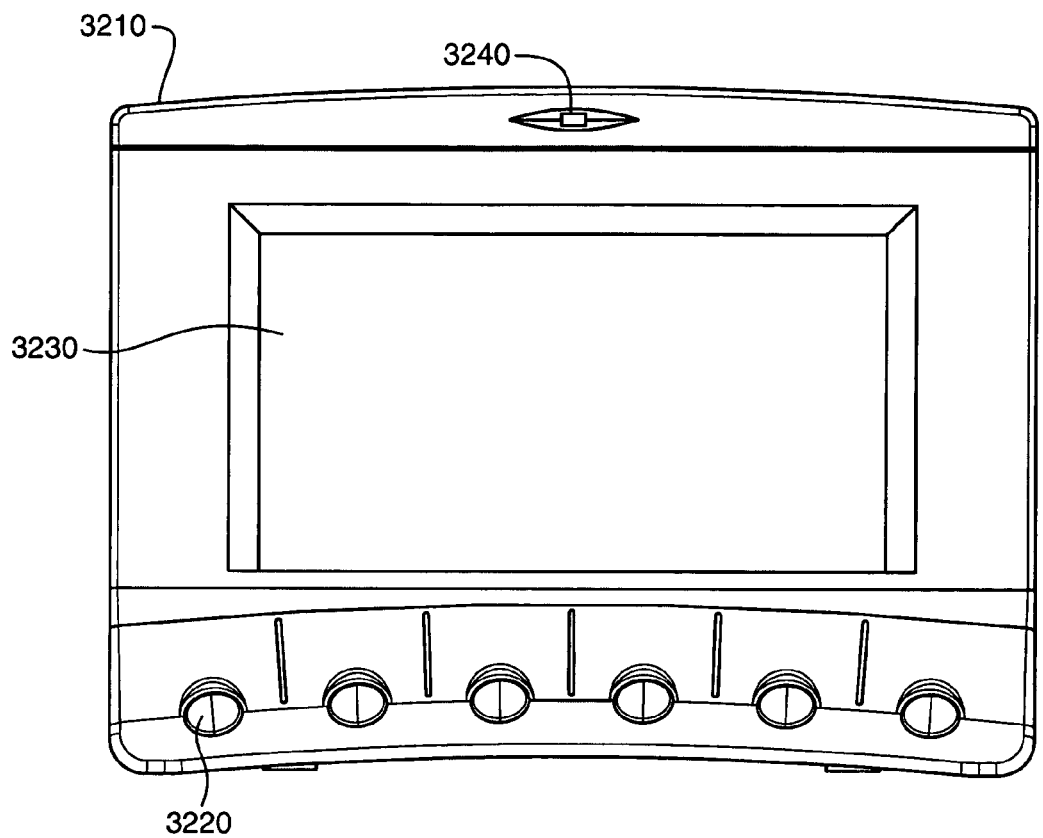
FIG. 38 shows a tabletop or wallmount Insteon™ touchscreen controller.
FIG. 39 is a layout of specific Insteon™ messages that can be sent according to certain assumptions for an example of an Insteon™ usage session.

FIG. 38 shows an Insteon™ controller device 3210 with a touchscreen liquid-crystal display (LCD) 3230 and six pushbuttons 3220. The touchscreen LCD can be monochrome or color and optionally backlit. LED 3240 provides additional user feedback.

Different snap-on backs can be used with the bodies 3010, 3110 and 3210 of the controllers in FIG. 36, FIG. 37 or FIG. 38. One snap-on back allows the controller to be used as a freestanding desktop unit. Another snap-on back can convert the controller to a wall-mount unit.

Usage of Insteon™ Messages

One skilled in the art will recognize that Insteon™ Messaging technology can be used in many different ways in many kinds of devices. To utilize the full set of possible Insteon™ Message types given in FIG. 13, devices must share a common set of specific, preassigned number values for the one- and two-byte commands, two-byte device types/subtypes, one- or two-byte ACK statuses, and one- or two-byte NAK reasons. Insteon™ devices are individually preassigned a three-byte Address at the time of manufacture.

For Insteon™ Extended messages, programmers are free to devise all kinds of meanings for the User Data that can be exchanged among devices. For example, device firmware could include an interpreter for an entire high-level language that is compiled into token strings and downloaded into devices using Extended messages.

There are countless possible user-interfaces that programmers can implement on Insteon™ devices. The following example will show one user-interface that can be implemented in firmware. Consider the case where a user wishes a switch module, such as that shown in FIG. 32, to control two lamp modules, such as shown in FIG. 34. Assume that the switch module has Insteon™ address 00003E, lamp module A has address 000054, and lamp module B has address 000051. In this example, all numbers are given in hexadecimal.

For the switch to control the lamp modules, there must be firmware in the devices that enables them to be linked as members of a common group. This firmware might respond to a series of Insteon™ Messages sent by a PC via a USB or RS232 interface device, or it might enable a user to link the devices manually by pressing buttons.

One possible firmware design that would allow users to manually accomplish the above group enrollment might be the following. First, the user would press and hold the Setup button 2650 on the switch module of FIG. 32. The switch module would broadcast a message giving its device type and a "Set Button Pressed" command. Second, the user would press the top of the switch paddle 2640 to indicate that devices will be joining a group. (Pressing the bottom of the paddle could indicate that devices are being removed from a group.) Third, the user would push the Setup button 2850 of lamp module A of FIG. 34. Lamp Module A broadcasts its device address, device type, and a "Set Button Pressed" command. The switch module sends a "Join Group" command with a group number (assume group number 1) using a Direct message to lamp module A. Lamp module A acknowledges the Direct message and updates its group membership database to show that it is a member of group 1. The switch module, when it receives the ACK, updates its own group membership database to show that lamp module A is a member of group 1. Fourth, the user would push the Setup button of lamp module B, and that device would be enrolled in group 1 following the same messaging procedure as for lamp module A. Finally, the user would push the top of the switch paddle on the switch module to end the group enrollment session.

Once group enrollment is complete, the user can operate both lamp modules at once using the switch module. Depending on the firmware design, many user interfaces are possible. For example by tapping the top of the paddle, the lamps could be turned on, and by pressing the bottom of the paddle, the lamps could be turned off. Pressing and holding the top of the paddle could brighten the lamps gradually until the user lets up. Dimming the lamps could be similarly accomplished using the bottom of the paddle.

Assuming the user taps the top of the switch paddle in order to turn on the two lamp modules, the Insteon™ Messages shown in FIG. 39 would be sent. Line 3310 is a Group Broadcast message telling group 1 to turn on. The From Address, 00003E, is the address of the switch module. The To Address, 000001, is the group number. The flags, CF or 11001111 in binary, signify Group Broadcast, Standard message, 3 Hops Left, 3 Max Hops. Command 1, the Group Command 01, means "Turn On," and Command 2, the parameter, is 00. The two lamp modules receive this message, check their group database, and finding that they are indeed members of group 1, execute the command to turn on their loads. Other recipients of the message are not members of group 1, so they ignore the message.

At line 3320, the switch module follows up the Group Broadcast command with a Direct Group-cleanup message to lamp module A, repeating the "Turn On" command. Again the From Address is 00003E, but this time the To Address is 000054, or lamp module A. The flags, 00, signify Direct, Standard message, 0 Hops left, 0 Max Hops. Command 1, 41, means "Group-cleanup, Turn On," and Command 2, the group number, is 01.

Line 3330 is the acknowledgement from lamp module A. The From Address, 000054, is lamp module A, and the To Address, 00003E, is the switch module. The flags, 20 or 00100000 in binary, signify ACK, Standard message, 0 Hops Left, 0 Max Hops. Command 1 and Command 2 are repeats of the same fields in the Direct message, 41 and 01.

Line 3340 and line 3350 are the Direct message and the ACK for lamp module B. The fields are the same except that the address of lamp module B, 000051, is substituted for 000054, the address of lamp module A.

From the foregoing description it will be apparent that the communication and control system using Insteon™ control and communication devices and Insteon™ protocol of the present invention have a number of advantages, some of which have been described above and others of which are inherent in the present invention.

Also, it will be understood that modifications can be made to the communication and control system and devices of the present invention without departing from the teachings of the present invention. Accordingly, the scope of the present invention is only to be limited as necessitated by the accompanying claims.

What is claimed is:

1. A communication module for use in a system including a plurality of said communication modules, said communication module comprising:

circuitry for storing a number, referred to as a module address, designating an address for said communication module;

circuitry for sending and receiving messages over at least one communications medium;

circuitry and software for generating messages and for receiving and deciphering messages;

each of said messages comprising a first number field, referred to as an originator address, designating the module address of the module originating the message, a second number field, referred to as a recipient address, designating the module address of an intended recipient module, a third number field, referred to as message flags, designating the type of message, a fourth number field, referred to as a maximum retransmission count, designating the maximum number of retransmissions for the message, a fifth number field, referred to as a current retransmission count, designating how many times the message has already been retransmitted, a sixth number field, referred to as a command field, designating an action, and a seventh number field, referred to as a message validator, designating a message integrity validation;

circuitry and software for determining if a received message has reached all of its intended recipients by inspecting said message flags and by comparing said recipient address to said module address;

circuitry and software for determining if a received message has already been retransmitted a maximum number of times for that message by comparing said maximum retransmission count and said current retransmission count; and circuitry and software for retransmitting a received message with said current retransmission count altered by one, but only if said received message has not reached all of its intended recipients and has not already been retransmitted the maximum number of times.

2. The communication module of claim 1 being constructed and arranged to send and receive messages over the mains powerline.

3. The communication module of claim 2 wherein said messages each comprise a plurality of signal packets, wherein each of said signal packets is synchronized with the zero crossing of an alternating current on the mains powerline.

4. The communication module of claim 3 wherein the number of said signal packets comprised in each of said messages is determined by one bit in said message flags.

5. The communication module of claim 4 wherein the number of said signal packets comprised in each of said messages is five if said bit is zero and eleven if said bit is one.

6. The communication module of claim 4 wherein each of said messages comprises an arbitrary data field if said bit is one.

7. The communication module of claim 6 wherein said arbitrary data field comprises fourteen bytes.

8. The communication module of claim 3 comprising circuitry and software for waiting after sending or receiving one of said messages for at least an additional one of said zero crossings to occur before sending another message.

9. The communication module of claim 3 wherein the number of said zero crossing periods for sending said messages is fixed for a given length message and messages are only sent beginning at a time period, referred to as a message time slot, comprising an integer multiple of said fixed number of said zero crossing periods.

10. The communication module of claim 9 comprising circuitry and software for sending retransmitted messages at the same time as other of said communication modules are sending identical messages.

11. The communication module of claim 9 comprising circuitry and software for sending a first retransmitted message during the first of said message time slots after the original message is sent, and subsequent retransmitted messages during subsequent ones of said message time slots.

12. The communication module of claim 9 comprising circuitry and software for originating and sending new messages only after the number of said message time slots elapsing after a previous message is sent by an originating communication module is equal to a number, referred to as a new message time slot delay, that is one plus said maximum retransmission count.

13. The communication module of claim 12 wherein, if the intended recipient module of said previous message can send an acknowledgement message to the originator of said previous message, said new message time slot delay is increased by one plus said maximum retransmission count.

14. The communication module of claim 3 comprising circuitry and software for detecting if other communication modules are sending messages and, if other messages are being sent, waiting for an integer number of said zero crossings before originating a new message.

15. The communication module of claim 3 comprising circuitry and software for retrying to send a message a fixed number of times if an acknowledgement message is not received from the intended recipient of said message.

16. The communication module of claim 15 comprising circuitry and software for incrementing, each time said message is retried, said maximum retransmission count, but not incrementing said maximum retransmission count past a maximum value allowed for retransmitting messages.

17. The communication module of claim 3 wherein said signal packets begin with a bit pattern for synchronizing receiving circuitry, and said bit pattern is longer for the first of said plurality of signal packets.

18. The communication module of claim 17 wherein said bit pattern comprises eight bits for the first of said signal packets and two bits for the remainder of said signal packets.

19. The communication module of claim 3 wherein said signal packets begin before and end after said zero crossing of said alternating current.

20. The communication module of claim 19 wherein said signal packets begin 800 microseconds before and end 1023 microseconds after said zero crossings of said alternating current.

21. The communication module of claim 3 comprising circuitry and software for sending and receiving signal packets using binary phase-shift keying of a carrier signal applied to the mains powerline.

22. The communication module of claim 21 wherein said carrier signal has a frequency of 131.65 kilohertz.

23. The communication module of claim 21 comprising circuitry and software for gradually shifting the phase of said carrier signal by inserting one and one-half cycles of signal at one and one-half times the frequency of said carrier signal.

24. The communication module of claim 3 comprising circuitry for sending and receiving X10 messages conforming to the X10 communications protocol.

25. The communication module of claim 24 comprising circuitry and software for receiving said X10 messages if another binary phase-shift keyed signal is not received within 450 microseconds after the zero crossing of an alternating current on the mains powerline.

26. The communication module of claim 24 comprising circuitry and software for continuing to receive one of said X10 messages until said X10 message is completed.

27. The communication module of claim 1 including an RE transceiver device for sending and receiving messages on a radio frequency.

28. The communication module of claim 27 wherein said radio frequency is an open, non-restricted radio frequency.

29. The communication module of claim 27 comprising circuitry and software for sending retransmitted messages via said radio frequency at the same time as other of said communication modules are sending identical messages via said radio frequency.

30. The communication module of claim 1 being constructed and arranged to send and receive messages over the mains powerline and also over a radio frequency.

31. The communication module of claim 30 comprising circuitry and software for retransmitting using said radio frequency a message received via the mains powerline, and for retransmitting using the mains powerline a message received via said radio frequency.

32. The plurality of communication modules of claim 30, with at least one of said communications modules connected to a different phase of the mains powerline, such that messages propagating on one phase of the mains powerline are propagated on another phase of the mains powerline after being relayed using said radio frequency.

33. The communication module of claim 30 comprising circuitry and software for sending and receiving messages via said radio frequency beginning at the next zero-crossing of the mains powerline following reception or transmission of messages via the mains powerline.

34. The communication module of claim 33 wherein said messages sent and received via said radio frequency are the same messages sent and received via the mains powerline.

35. The communication module of claim 1 wherein said maximum retransmission count varies from zero to a small integer.

36. The communication module of claim 35 wherein said small integer is three.

37. The communication module of claim 1 comprising circuitry and software which, upon receiving one of said messages with said recipient address matching said module address, sends an acknowledgement message to the module originating the message by interchanging said recipient address and said originator address.

38. The communication module of claim 1 comprising circuitry and software for determining that a received message is correct and not corrupted by using said message validator as a cyclic redundancy check.

39. The communication module of claim 38 comprising circuitry and software that sends a non-acknowledgement message to the module originating the message if the message is determined to be corrupted.

40. The communication module of claim 1 comprising circuitry and software for maintaining a database containing group membership associations between a group number and a plurality of module addresses of other communication modules.

41. The communication module of claim 40 comprising circuitry and software for sending a message referred to as a group broadcast message to a plurality of communication modules by including said group number in said recipient address, setting a first bit in said message flags to a value indicating that said message is a group message, and setting a second bit in said message flags to a value indicating that all modules associated with said group number are intended message recipients.

42. The communication module of claim 41 comprising circuitry and software for following said group broadcast message with a message referred to as a group follow-up message to each one of said plurality of communication modules, with said recipient address matching one of said module addresses associated with said group number in said database of said communication module, said command field containing said group number, said first bit in said message flags set to a value indicating that said message is a group message, and said second bit in said message flags set to a value indicating that only one module associated with said group number is the intended message recipient.

43. The communication module of claim 40 comprising circuitry and software for receiving a message referred to as a group broadcast message with said group number in said recipient address, a first bit in said message flags set to a value indicating that said message is a group message, and a second bit in said message flags set to a value indicating that all modules associated with said group number are intended message recipients, wherein said communication module only processes said message if said database contains an association between said group number and the address of the communication module originating said message.

44. The communication module of claim 43 comprising circuitry and software for receiving a message referred to as a group follow-up message with said recipient address matching said module address, said command field containing said group number, a first bit in said message flags set to a value indicating that said message is a group message, and a second bit in said message flags set to a value indicating that only one module associated with said group number is the intended message recipient, wherein said communication module only processes said follow-up message if it did not previously process said group broadcast message.

45. The communication module of claim 1 comprising serial communications interface circuitry and software for communicating with another network using a different signaling protocol.

46. The communication module of claim 1 comprising serial communications interface circuitry and software for communicating with external digital equipment.

47. The communication module of claim 46 wherein said serial communications interface circuitry and software comprises a Universal Serial Bus link.

48. The communication module of claim 46 wherein said serial communications interface circuitry and software comprises an RS232 link.

49. The communication module of claim 46 wherein said serial communications interface circuitry and software comprises an Ethernet link.

50. The communication module of claim 46 wherein said serial communications interface circuitry and software comprises an Internet Protocol connection.

51. The communication module of claim 1 comprising control circuitry for operating a device associated with said communication module.

52. The communication module of claim 51 wherein said associated device comprises circuitry for delivering varying amounts of current to a load.

53. The communication module of claim 51 wherein said associated device comprises circuitry for sensing the amount of current drawn by a load.

54. The communication module of claim 51 wherein said associated device comprises a plurality of push button switches for initiating a plurality of command functions.

55. The communication module of claim 51 wherein said associated device comprises a graphical display with a plurality of push button switches for initiating a plurality of command functions.

56. The communication module of claim 51 wherein said associated device comprises a graphical display with a touch screen.

57. The communication module of claim 51 wherein said associated device comprises a sensor for determining the state of the environment.

58. The communication module of claim 51 wherein said associated device comprises voice response circuitry and software.

59. The communication module of claim 51 wherein said associated device comprises voice recognition circuitry and software.

60. The communication module of claim 51 wherein said associated device comprises image capture and processing circuitry and software.

61. The communication module of claim 51 comprising a housing with a bottom member attached to one of a mounting for resting on a desktop, or a mounting for attaching to a wall.

62. The communication module of claim 51 comprising at least one white light-emitting diode with an interchangeable colored filter for altering the viewed color of said light-emitting diode.

63. A method for sending and receiving messages containing digital information among communicating modules, said method comprising the steps of:
 providing each module with an address, referred to as a module address;
 providing each message with a first number field, referred to as an originator address, designating the module address of a module originating said message;
 providing each message with a second number field, referred to as a recipient address, designating the module address of an intended recipient module;
 providing each message with a third number field, referred to as message flags, designating the type of message;

providing each message with a fourth number field, referred to as a maximum retransmission count, designating the maximum number of retransmissions for said message;

providing each message with a fifth number field, referred to as a current retransmission count, designating how many times said message has already been retransmitted;

providing each message with a sixth number field, referred to as a command field, designating an action;

providing each message with a seventh number field, referred to as a message validator, designating a message integrity validation;

determining if a received message has reached all of its intended recipients by inspecting said message flags and by comparing said recipient address to said module address;

determining if a received message has already been retransmitted a maximum number of times for that message by comparing said maximum retransmission count and said current retransmission count; and retransmitting a received message with said current retransmission count altered by one, but only if said received message has not reached all of its intended recipients and has not already been retransmitted the maximum number of times.

\* \* \* \* \*